United States Patent
Hidesawa et al.

(10) Patent No.: US 6,883,005 B2
(45) Date of Patent: Apr. 19, 2005

(54) SERVER MACHINE, CLIENT MACHINE, SERVER PROGRAM STORAGE MEDIUM AND CLIENT PROGRAM STORAGE MEDIUM

(75) Inventors: Shigeru Hidesawa, Kawasaki (JP); Kazuhiko Nakamura, Kawasaki (JP); Daisuke Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 10/057,888

(22) Filed: Jan. 29, 2002

(65) Prior Publication Data

US 2003/0067477 A1 Apr. 10, 2003

(30) Foreign Application Priority Data

Oct. 5, 2001 (JP) .................................. 2001-310460

(51) Int. Cl.⁷ .............................................. G06F 17/30
(52) U.S. Cl. ....................................................... 707/10
(58) Field of Search .............................. 707/10; 709/205

(56) References Cited

U.S. PATENT DOCUMENTS 6,177,932 B1 * 1/2001 Galdes et al. ............... 345/733
6,230,287 B1 * 5/2001 Pinard et al. .................. 714/31
6,615,240 B1 * 9/2003 Sullivan et al. ............. 709/205

OTHER PUBLICATIONS

VAIO/SUPPORT/Homepage, used before filing date of corresponding Japanese patent application (with full translation).

HelpSpot Homepage, used before filing date of corresponding Japanese patent application (with full translation).

* cited by examiner

Primary Examiner—Jack M. Choules
(74) Attorney, Agent, or Firm—Staas & Halsey LLP

(57) ABSTRACT

The present invention relates to the client machine and the server machine and the like which are connected to the communication line, and answers are accurately given to a question of a user of the client machine according to a level of that question. First, the solution of the answer is attempted inside the client machine (primary answer section 61) and, if not solved, an enquiry is made to the server machine (secondary answer request section 63) and, if not yet solved, a mail is transmitted to a support window (e-mail soft 66).

23 Claims, 20 Drawing Sheets

SERVER MACHINE, CLIENT MACHINE, SERVER PROGRAM STORAGE MEDIUM AND CLIENT PROGRAM STORAGE MEDIUM

BACKGROUND OF THE INVENTION

1. Field of the Invention

The present invention relates to a server machine connected to a client machine which receives the feeding of information by a communication line, the client machine connected to the server machine which feeds information by the communication line, a server program storage medium which stores a server program to allow a computer to operate as the server machine and a client program storage medium which stores a client program to allow the computer to operate as the client machine.

2. Description of the Related Art

In recent years, personal computers (hereinafter, sometimes referred to as PC) have been mounted with a large number of hardware in addition to a large number of software. For this reason, there have been many occasions of getting into a trouble during the use of the PC or running into a problem while using the PC. When running into whatever trouble or problem, the user of the PC has attempted to solve the trouble or the problem by performing a failure diagnosis by using a tool to diagnose the trouble of the hardware of the PC or by searching a cause of problem by referring to a correlation table (Q & A) of questions and answers provided inside the PC.

However, the user has few occasions of using the diagnosis tool or referring to the Q & A unless there occurs any trouble and, even if occasion demands, it is difficult for him to promptly manipulate the diagnosis tool or to aptly refer to the Q & A. The existing situation is such that it is far from arriving at solving the trouble or settling the problem.

In order to cope with such a situation, at the side of the PC manufacture, there is provided a telephone support window to receive various questions from the user and arrangements to receive telephone talks are established. Nevertheless, there are many cases where telephones are hard to connect due to a rush of telephone talks and it cannot be said that service arrangements are not enough for the user.

In recent years, many PC have come to be connected to communication lines such as the Internet, and there are some cases where a system to download the problem solution via the Internet is adapted (see: http://vcl.vaio.sony.co.jp./info/cyber/index.html). However, in this case, when any problem on the PC is to be solved, when it is not solved by retrieving the previously downloaded problem solution, the problem solution is updated by downloading a recent problem solution and a retrieval is required to be made again by using the updated data. In recent years, as described above, both hardware and software have been enhanced quantity and quality-wise, and the problem solution data has become extremely large so that it takes a time to download the data and requires a very large memory amount to store it inside the PC.

On the other hand, there exists another system (see; http://www.gw2k.co.jp./helpspot/iwr/index.shtml; note that this has been changed to the current URL, http://jp.gateway.com/helpspot/iwr/), wherein the problem solution is stored at the server and, the information regarding the problem of the user is inputted on its home page, and the server retrieves the solution for the problem and presents it to the PC of the user via the Internet and, if the problem is not solved in spite of that, that information is transmitted to the supporter of the manufacturer's side.

In this case, it is not necessary to download the problem solution itself and the time required to download it is saved. Further, since there is no need to store the problem solution itself, it saves a memory capacity. However, there is a problem that the PC which not connected to the Internet is unable to receive the services. Further, even in the case of the PC which is connected to the Internet, even for a small matter, it is necessary to open the home page of the server via the Internet and enter minute data there so as to ask a question, and this results in a problem that it is difficult to use the services provided in this system. Further, in the case where the public line (telephone line) is used for utilizing the Internet, the line is required to be always connected for the problem solution, and it creates a cause of increasing a fee collection.

In view of the above described situation, the object of the present invention is to provide a client machine, a server machine, a client program storage medium and a server program storage medium that stores a client program or a server program which allow a computer to operate as the client machine and the server machine, that constitute a system capable of accurately drawing out an answer according to a level of question of the user.

A client machine of the present invention which achieves the above described object is connected to a server machine by a communication line, the client machine displaying an answer screen corresponding to the question of the user, comprising:

a primary answer section for receiving an operation of the user and finding an answer corresponding to the operation of the user inside the client machine and displaying a primary answer screen which indicates that answer;

a client information accumulation section for accumulating the client information which indicates the user operation and /or the details of the primary answer screens according to the user operation received by the primary answer section;

a secondary answer request section for transmitting the client information accumulated in the client information accumulation section to a server machine and requesting the server machine to answer the user's question; and a secondary answer section for obtaining the answer transmitted from the server machine according to the request for the answer to the server machine by the secondary answer request section and displaying the secondary answer screen which indicates that answer.

The client machine of the present invention obtains the answer by using the primary answer section which first finds an answer inside the client machine and, if that answer is not satisfactory, asks the server machine a question. By providing such a two-stage system, even in the case where the server machine is cut off from the communication line, a sufficient answer can be obtained for a question of a certain level, and the trouble of making an inquiry to the sever machine for a simple question can be prevented.

Further, in the present invention, the client information which indicates the user operation to ask a question and/or the details of the answer of the primary answer section for the user operation is accumulated, and that information is transmitted to the server machine when an enquiry is made to the server machine and, therefore, the operation of asking again the server machine a question from the very beginning is omitted, and the server machine can prepare an answer upon having a knowledge about what kind of action was taken in order to find an answer in the primary answer section, so that more accurate answer can be prepared.

Here, in the above described client machine of the present invention, it is preferable that a communication start instruction section for starting a communication with the above described server machine is provided, and the secondary answer section transmits the client information to the server machine according to the operation of the communication start instruction section. In this case, it is further preferable that the above described primary answer section displays the communication start instruction section inside the primary answer screen which at least indicates the final answer, which can answer to the question of this time of the user in the primary answer section.

In the above described client machine of the present invention, it is preferable that the client information accumulated by the client information accumulation section is transmitted to the window which receives the question of the user and, in this case, it is preferable that that client information is transmitted to the window by e-mail.

Further, it is preferable that the above described client machine of the present invention receives the question from the user regarding a trouble occurred in that client machine and displays the answer screen which indicates the answer aiming at the solution of the trouble.

Further, in the above described client machine of the present invention, the secondary answer section displays a mailing instruction section to activate an e-mail software in the secondary answer screen, and it is preferable that the e-mail software is activated according to the operation of the mailing instruction section by the user on the secondary answer screen including the mailing instruction section, and an e-mail link section to deliver a mail address of the window on the e-mail which receives the question of the user is provided in the e-mail software.

In this case, it is preferable that the above described mailing instruction section is displayed inside the secondary answer screen which at least indicates the final answer, which can answer to the question of this time of the user in the server machine.

In this way, in the case where even the answer from the server machine is insufficient, by being linked with the e-mail software, the system becomes convenient to operate and the operation of closing this system and activating again the e-mail software can be omitted.

Here, in the constitution comprising the above described e-mail link section, it is preferable that the client information accumulation section accumulates the user operation and/or the history of the secondary answer screen display according to the user operation as the client information, and the e-mail link section delivers the above described mail address to the e-mail software and, further, delivers the client information accumulated by the client information section.

Even after making an enquiry to the server machine, the client information is continuously collected and delivered to the e-mail software, and the supporter who receives an e-mail prepared by the e-mail software refers to that client information and can make an adequate answer.

Here, while the present invention may reply to the question of whatever field it is, as a typical example, the client machine of the present invention may be a machine for receiving the question from the user regarding the trouble occurred in the client machine and displaying the answer screen which indicates the answer aiming at the solution of the trouble.

The server machine of the present invention which achieves the above described object is connected to the client machine which receives the feeding of information by the communication line and transmits the answer to the question of the user of the client machine to the client machine, wherein the above described client machine receives the operation of the user and finds the answer according to the operation of the user inside the client machine and displays the primary answer screen which indicates that answer, and accumulates the user operation and/or the client information which indicates the history of the primary answer screen according to the user operation and transmits the client information to this server machine so as to request the answer to the question of the user, comprising:

a client information section which receives the transmitted client information;

an answer specifying section for specifying the answer to the question of the user of the client machine based on the client information received by the client information section; and an answer transmitting section for transmitting the specified answer by the answer specifying section to the client machine.

The server machine of the present invention receives the client information and retrieves the answer based on that client information and therefore a possibility of finding more adequate answer is enhanced.

Further, the client program storage medium of the present invention which achieves the above described object stores a client program, which is executed inside the computer connected to the server machine which feeds information by the communication line, and which allows the computer to operate as the client machine to indicate the answer screen according to the question of the user, wherein the client program medium stores the client program to allow the above-described computer to operate as the client machine comprising;

the primary answer section which receives the operation of the user, finds the answer according to the operation of the user inside that computer and displays the primary answer screen which indicates that answer;

the client information accumulation section which accumulates the client information which indicates the user operation and/or the details of the primary answer screen display according to the user operation received by the primary answer;

the secondary answer request section which transmits the client information accumulated in the client information accumulation section to the server and requests the server machine to answer to the question of the user; and the secondary answer section which obtains the answer transmitted from the server machine according to the request for the answer to the server machine by the secondary answer request section and displays the secondary answer screen which indicates that answer.

Further, the server program storage medium of the present invention which achieves the above described object stores a server program, which is executed inside the computer connected to the client machine which receives the feeding of information by the communication line, and which allows the computer to operate as the server machine to transmit the answer to the question of the user of the client machine to the client machine, wherein the above described client machine receives the operation of the user, finds the answer according to the operation of the user inside that client machine and displays the primary answer screen which indicates that answer, and accumulates the client information which indicates the user operation and/or the history of the primary answer screen display according to the user operation and transmits the client information to this server machine so as to request the answer to the question of the user, and wherein the server program storage medium stores the server machine program to allow the above described computer to operate as the server machine comprising:

the client information receiving section which receives the transmitted client information;

the answer specifying section which specifies the answer to the question of the user of the client machine based on the client information received by the client information receiving section; and the answer transmitting section which transmits the answer specified by the answer specifying section to the client machine.

The client program storage medium of the present invention includes all the program storage mediums storing the client programs corresponding to various modes to the client machine of the present invention and, further, the server program storage medium of the present invention includes all the program storage mediums storing the server programs corresponding to various modes of the server machine of the present invention.

BRIEF DESCRIPTION OF THE DRAWINGS

FIG. 9 is a view showing the screen to be displayed when a problem occurred on the hardware of that computer.

FIG. 16 is a view showing a personal authentication screen.

FIG. 17 is a view showing a user registration screen.

FIG. 19 is a view showing an example of a mail link screen to be displayed when an [online assistant] button is clicked.

FIG. 21 is a view indicating the screen to show a transmission result.

DETAILED DESCRIPTION OF THE PREFERRED EMBODIMENTS

Hereinafter, the embodiments of the present invention will be described.

First, a hardware configuration of a computer to operate as an embodiment of a server machine of the present invention and a computer to operate as an embodiment of a client machine of the present invention will be described.

Figure 1:
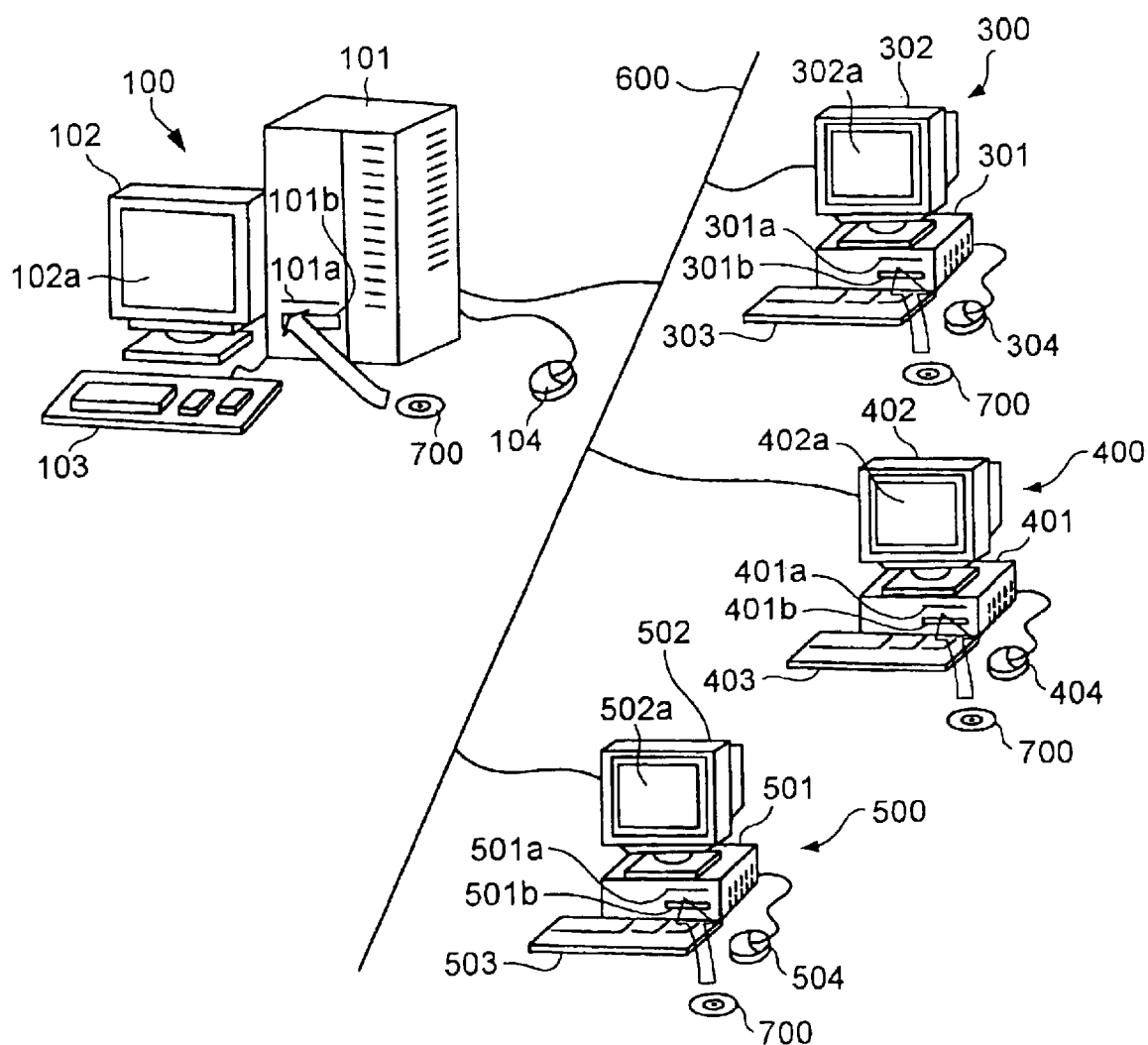
FIG. 1 is a view showing a part of a computer system to operate a server machine and a client machine.

FIG. 1 is a view showing a section of a computer system to operate a server machine and a client machine.

Here, one set of a computer 100 to operate as the server machine and three sets of computers 300, 400, 500, which are connected to this computer 100 by a communication line 600, to operate as the client machine are illustratively shown. The communication line 600 may be any one of the Internet, LAN (Local Area Network), WAN (Wide Area Network) and the like.

One set of the computer 100 is installed with a server program, and three sets of the computers 300, 400, 500 are installed with client programs, respectively, and each set operates as the server machine and the client machine.

As these computers 100, 300, 400, 500, the computer referred to as a operate station or a personal computer can be generally used.

These respective computers 100, 300, 400, 500 comprise: main body sections 101, 301, 401, 501 built-in-with CPU (central processing unit), RAM (random access memory), a hard disc, a communication board and the like; display sections 102, 302, 402, 502 which display images and character strings according to the instruction from the main body sections on display screens 102a, 302a, 402a, 502a; key boards 103, 303, 403, 503 to input the instruction of the user to respective computers 100, 300, 400, 500; and mouse 104, 304, 404, 504 for designating a random position on the display screens 102a, 302a, 402a, 502a so that the instruction according to the icon and the like which was displayed on that position in that designating time is inputted.

The main body sections 101, 301, 401, 501 have further outwardly, flexible disc loading apertures 101a, 301a, 401a, 501a for loading flexible discs (not shown), and CD-ROM loading apertures 101b, 301b, 401b, 501b for loading CD-ROM 700 and, inside these apertures, a flexible disc drive and a CD-ROM drive which drive and access the flexible discs and CD-ROM 700 inserted from those loading apertures 101a, 301a, 401a, 501a, 101b, 301b, 401b, 501b are also built-in.

Figure 2:
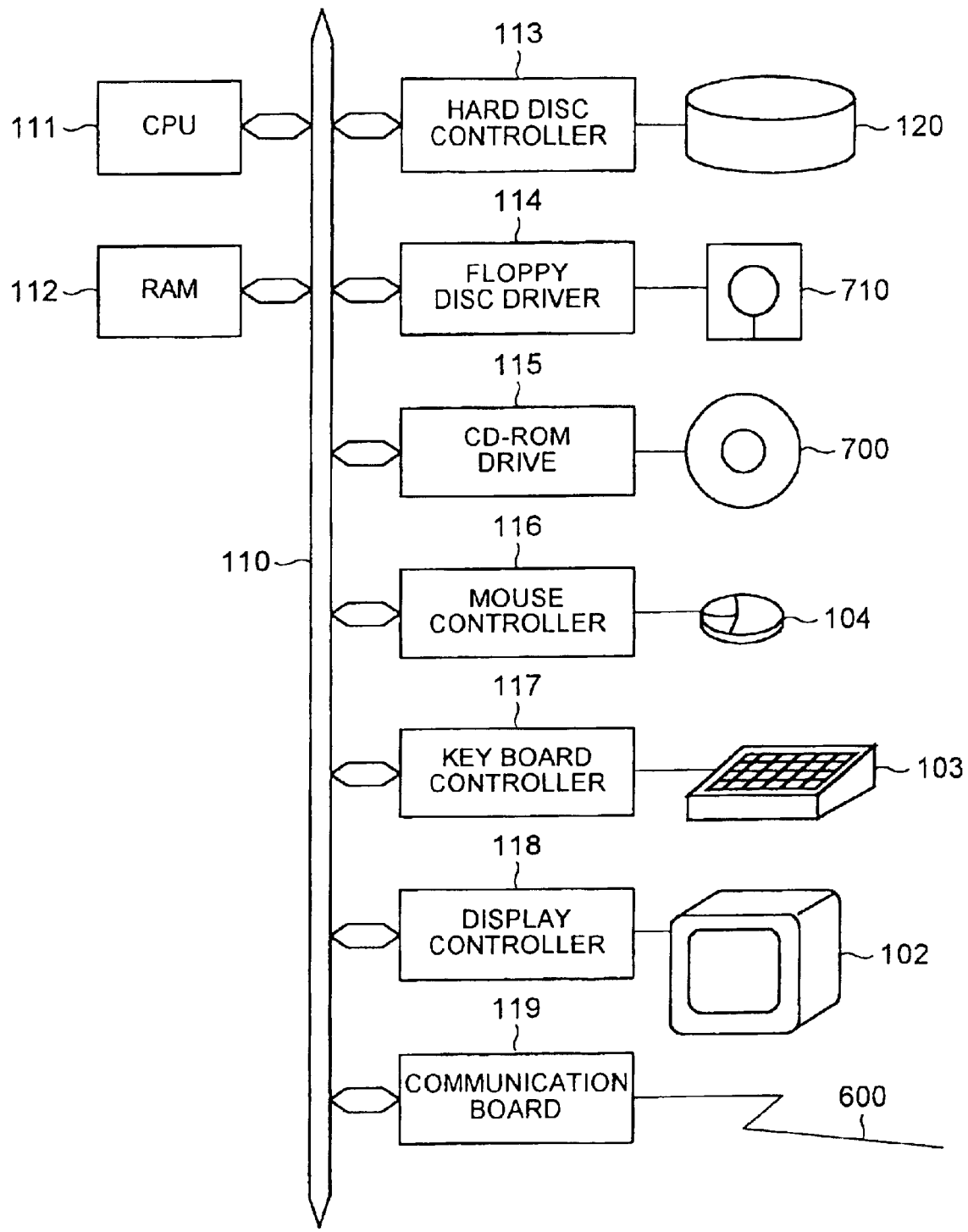
FIG. 2 is a view showing hardware configuration of a computer having an outward appearance shown in FIG. 1.

FIG. 2 is a view showing hardware configuration of the computer having the appearance shown in FIG. 1. Here, though the description will be made by representatively taking up the computer 100, the computers 300, 400, 500 have the same constitution.

Illustrated in the hardware schematic diagram of FIG. 2 are a CPU 111, a RAM 112, a hard disc controller 113, a flexible disc drive 114, a CD-ROM drive 115, a mouse controller 116, a key board controller 117, a display controller 118 and a communication board 119, which are mutually connected by a bus 110.

As described with reference to FIG. 1, the flexible disc drive 114 and the CD-ROM drive 115 access the flexible disc 710 and the CD-ROM 700 which were loaded respectively from the flexible disc loading aperture 101a and the CD-ROM loading aperture 101b. The communication board 119 is connected to the communication line 600.

Illustrated further in FIG. 2 are a hard disc 120 accessed by the hard disc controller 113, a mouse 104 controlled by the mouse controller 116, a key board 103 controlled by the key board controller 117 and a CRT display 102 controlled by the display controller 118.

The CD-ROM loading apertures 101b, 301b, 401b, 501b of respective computers as described above are loaded with the CD-ROM 700 which is the server program storage medium or the client program storage medium storing the server program or the client program of the present invention to be described below, and the server program stored in the CD-ROM 700 is installed in the computer 100 and the client program is installed in three sets of the computers 300, 400, 500, so that the server machine and the client machine are constructed and operated.

Or the client programs may be downloaded to the computers 300, 400, 500 via the communication line 600. Note that these programs may be stored in advance in the hard disc 120.

Next, the description will be made on the server program, the server program storage medium, the client program and the client program storage medium as one of the embodiments of the present invention.

Figure 3:
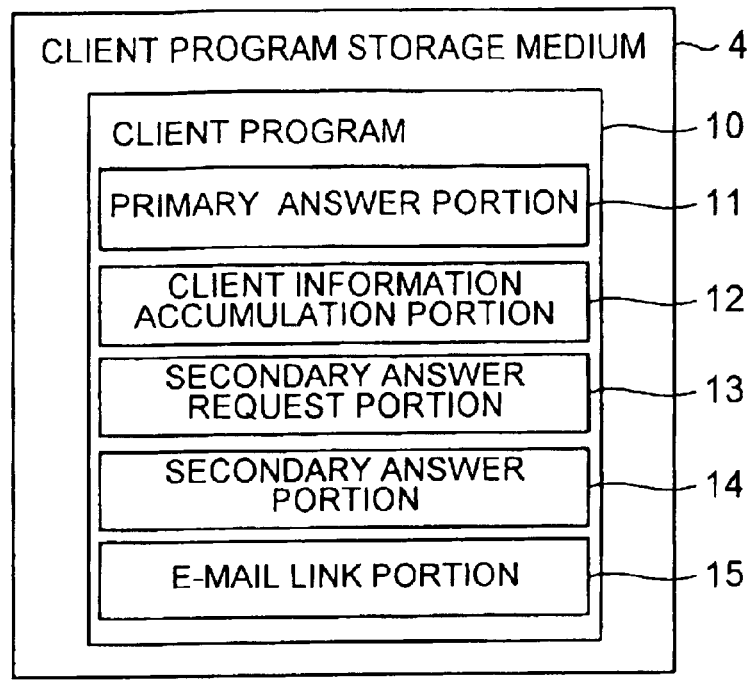
FIG. 3 is a schematic diagram of a client program and a client program storage medium.
Figure 4:
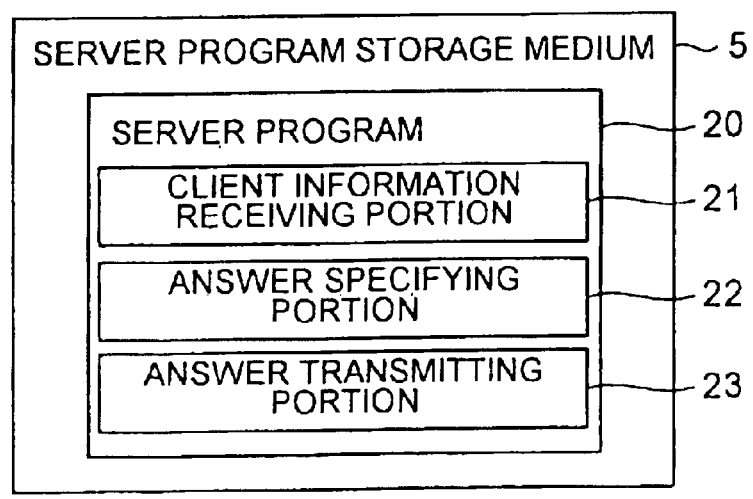
FIG. 4 is a schematic diagram of a server program and a server program storage medium.

FIG. 3 is a schematic diagram of the client program and the client program storage medium as one aspect of the embodiment of the present invention, and FIG. 4 is a schematic diagram of the server program and the server program storage medium as one aspect of the embodiment of the present invention.

As shown in FIG. 3, this client program storage medium 4 stores the client program having a primary answer section 11, a client information accumulation section 12, a secondary answer request section 13, a secondary answer section 14 and an e-mail link section 15.

This client program storage medium 4 is a representative name of the CD-ROM which stores the client program, and the hard disc of the computer after it is installed in the computer and the like.

The client program 10 is executed by the computers 300, 400, 500 (see FIG. 1) respectively, which are connected to the server machine by the communication line 600, and these respective computers are allowed to operate as the client machine which receives the feeding of information from the server machine.

In the present embodiment, in the client machine constituted by the execution of this client program, the question from the user regarding the trouble and the like which occurred in that client machine are received, and the answer screen which indicates the answer aiming at the solution of the trouble and the like is displayed.

The primary answer section 11 receives the user operation from the mouse and the key board, finds the answer according to the user operation inside that client machine and displays the primary answer screen which indicates that answer on the display screen. This primary answer section 11 displays a communication start button that starts the communication with the server machine inside the primary answer screen which indicates at least the final answer, which can answer to the question of this time of the user in the primary answer section.

In this primary answer section 11, the answer to the question of the user can be found, for example, by activating a tool which detects a failure on the hardware, or by retrieving the answer to the question stored in the database.

Further, the client information accumulation section 12 accumulates the client information which indicates the user operation and the history of the primary answer screen display according to the user operation received by the primary answer section 11. In this client information accumulation section 12, the user operation and the details of the secondary answer screen display (to be described later) according to the user operation after the operation of the communication start button on the primary answer screen by the user are also accumulated as the client information.

Further, the secondary answer request section 13 transmits the client information accumulated in the client information accumulation section 12 to the server machine according to the operation of the communication start button by the user on the primary answer screen including the communication start button indicated by the primary answer section and request to the server machine for the answer to the question of the user.

Further, the secondary answer section 14 obtains the answer sent from the server machine according to the request for the answer to the server machine by the secondary answer request section 13 and displays the secondary answer screen, which indicates that answer. This secondary answer section displays a mailing button that activates an e-mail software inside the secondary answer screen which indicates at least the final answer, which can answer to the question of this time of the user in the server machine.

Further, when the user operates the mailing button on the secondary answer screen which includes the above described mailing button displayed by the secondary answer section 14, the e-mail link section 15 activates the e-mail software according to that operation and delivers the mail address of the window on the e-mail which receives the question of the user to that e-mail software. From this e-mail link section 15, that mail address is delivered to the e-mail software, and the client information accumulated in the client information accumulation section 12 is also delivered.

Further, the server program storage medium 5 shown in FIG. 4 stores a server program 20 having the client information receiving section 21, the answer specifying section 22 and the answer receiving section 23.

This server program storage medium 5 represents, similarly to the client program storage medium 4, the CD-ROM which stores the server program, the hard disc of the computer after the server program is installed in that computer and the like.

This server program 20 is executed by the computer 100 (see FIG. 1) which is connected by the communication line 600 to the client machine which receives the feeding of information, and allows the computer installed with this server program 20 to operate as the server machine to transmit the answer to the question of the user of the client machine to that client machine.

Here, the client machine which is connected to the computer via the communication line and which operates as the server machine by the execution of this server program receives the operation of the user, finds the answer according to the user operation inside that client machine and displays the primary answer screen which indicates that answer, and accumulates the client information which indicates the user operation and the details of the primary answer screen display according to the user operation and transmits the accumulated client information to that server machine so as to request the answer to the question of the user.

The client information receiving section 21 of the client program 20 shown in FIG. 4 receives the transmitted client information. The answer specifying section 22 specifies the answer to the question of the user of the client machine based on the client information received by the client information receiving section 21. Further, the answer transmitting section 23 transmits the answer specified by the answer specifying section to the client machine.

Inside the server machine, the answer to the client information is stored in advance as a database, and the answer specifying section 22 obtains the answer by retrieving that database. Or the answer specifying section 22 may create the answer from a knowledge database.

Figure 5:
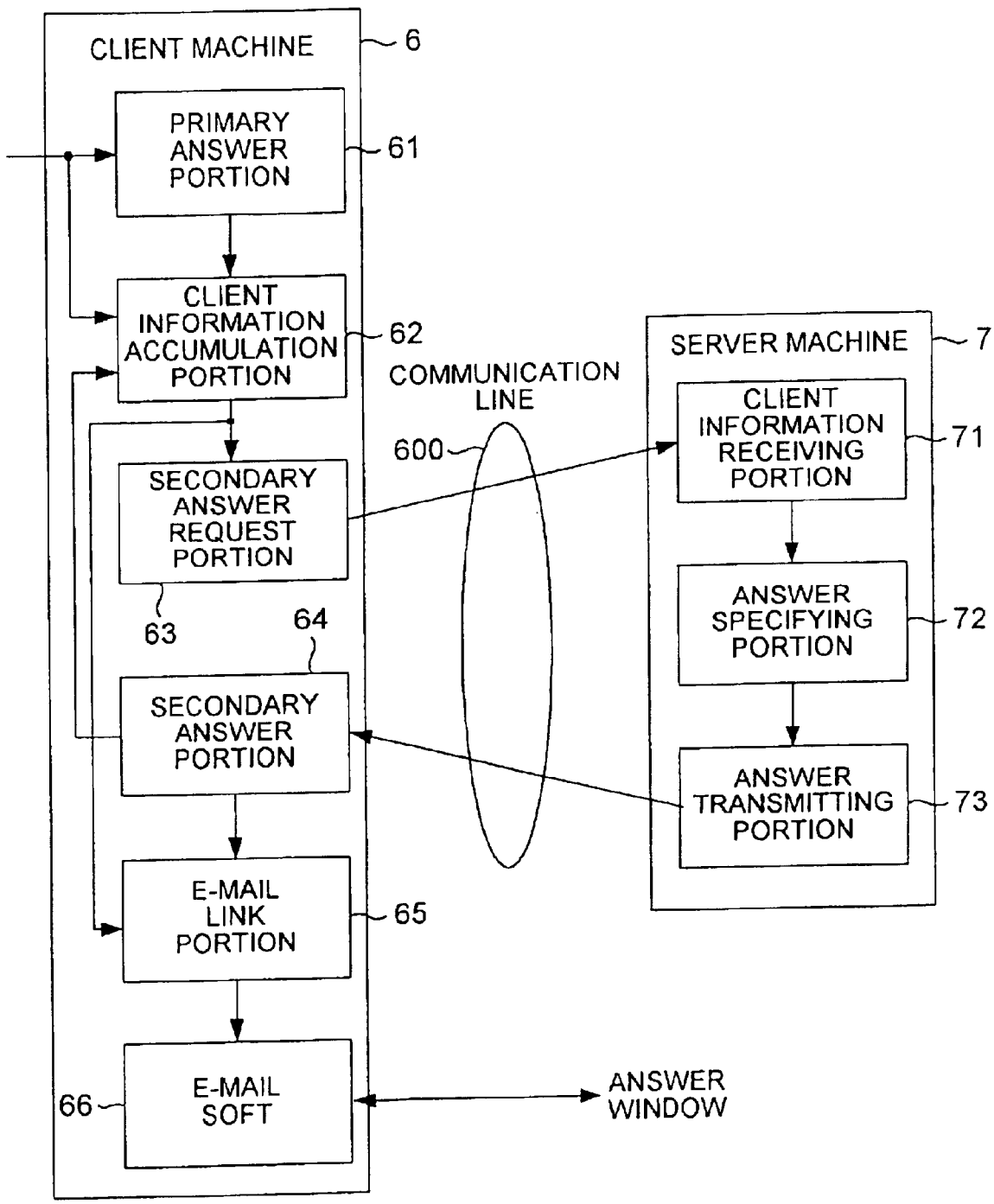
FIG. 5 is a functional block diagram showing one embodiment of the client machine and the server machine of the present invention.

FIG. 5 is a functional block diagram showing one aspect of the embodiment of the client machine and the server machine of the present invention.

Illustrated In FIG. 5 are a client machine 6 constructed on the computer of the user side, a server machine 7 constructed on the computer of the maker side and a communication line 100 which connects the client machine 6 and the server machine 7. Illustrated in FIG. 1 are three sets of the computers 300, 400, 500 which operate as the client machines, but in FIG. 5, in order to avoid complicatedness, one set of computer among the three sets, that is, the client machine constructed inside that one set of the computer alone is shown.

The client machine 6 shown in FIG. 5 includes a primary answer section 61, a client information accumulation section 62, a secondary answer request section 63, a secondary answer section 64 and an e-mail link section 65 and, further, is installed with an e-mail software 66.

The primary answer section 61, the client information accumulation section 62, the secondary answer request section 63, the secondary answer section 64 and the e-mail link section 65, which constitute this client machine 6, are components equivalent to the primary answer section 11, the client information accumulation section 12, the secondary answer request section 13, the secondary answer section 14 and the e-mail link section 15, respectively, which constitute the client program 10 shown in FIG. 3. The different point in-between is that the primary answer section 11, the client information accumulation section 12, the secondary answer request section 13, the secondary answer section 14 and the e-mail link section 15, which constitute the client program 10, comprise an application program and the data attached to it, while the primary answer section 61, the client information accumulation section 62, the secondary answer request section 63, the secondary answer section 64 and the e-mail link section 65, which constitute the client machine 6 of FIG. 5, comprise a composition of an application program and the hardware of the computer or OS (operation system) and the like. The actions of respective sections 61 to 65 of the client machine 6 of FIG. 5 are the same as those of respective sections 11 to 15 the client program 10 of FIG. 3, and a repetitive description thereof will be omitted here.

In the present embodiment, the e-mail software 66 is prepared separately from the client program 10 of FIG. 3 and installed in the client machine 6. This is the e-mail software linked to the client program 10 of FIG. 3 installed in that same client machine. The e-mail software 66 can be activated independently by the user operation and, further, can be activated from the e-mail link section 65. When activated from the e-mail link section 65, the e-mail software 66 receives a mail address of the window on the e-mail which receives the question of the user of the client machine 6 and the feeding of the client information accumulated so far, and transmits the fed client information to the mail address when transmitting the mail which the user inputted. By so doing, the supporter of the answer window who received the e-mail comes to know the details, which the user checked so far, thereby making it possible to cope with the situation more effectively.

Note that the e-mail software may be incorporated into the client program as one component of the client program.

Further, the server machine 7 shown in FIG. 5 comprises a client information receiving section 71, an answer specifying section 72 and an answer transmitting section 73.

The client information receiving section 71, the answer specifying section 72 and the answer transmitting section 73 which constitute this server machine 7 are equivalent respectively to the client information receiving section 21, the answer specifying section 22, and the answer transmitting section 23, which constitute the server program 20 shown in FIG. 4. However, the different point in-between is that the client information receiving section 21, the answer specifying section 22 and the answer transmitting section 23 of the server program 20 of FIG. 4 comprise an application program and the data attached to it, while the client information receiving section 71, the answer specifying section 72 and the answer transmitting section 73 of the server machine 7 of FIG. 5 comprise a composition of the application program, the hardware of the computer, OS (operation system) and the like. The actions of respective sections 71 to 73 of the server machine 7 of FIG. 5 are the same as the actions of respective sections 21 to 22 of the server program 20 of FIG. 4, and the repetitive description thereof will be omitted.

Hereinafter, the action of the present embodiment will be specifically described with reference to the example of the screen which is displayed in the display screen (for example, the display screen 302a of the display section 302 of one set of the computer 300 among three sets of computers 300, 400, 500 shown in FIG. 1) of the display section of the computer which operates as the client machine. Here, the e-mail software will be described as integrally incorporated into the client program.

Figure 6:
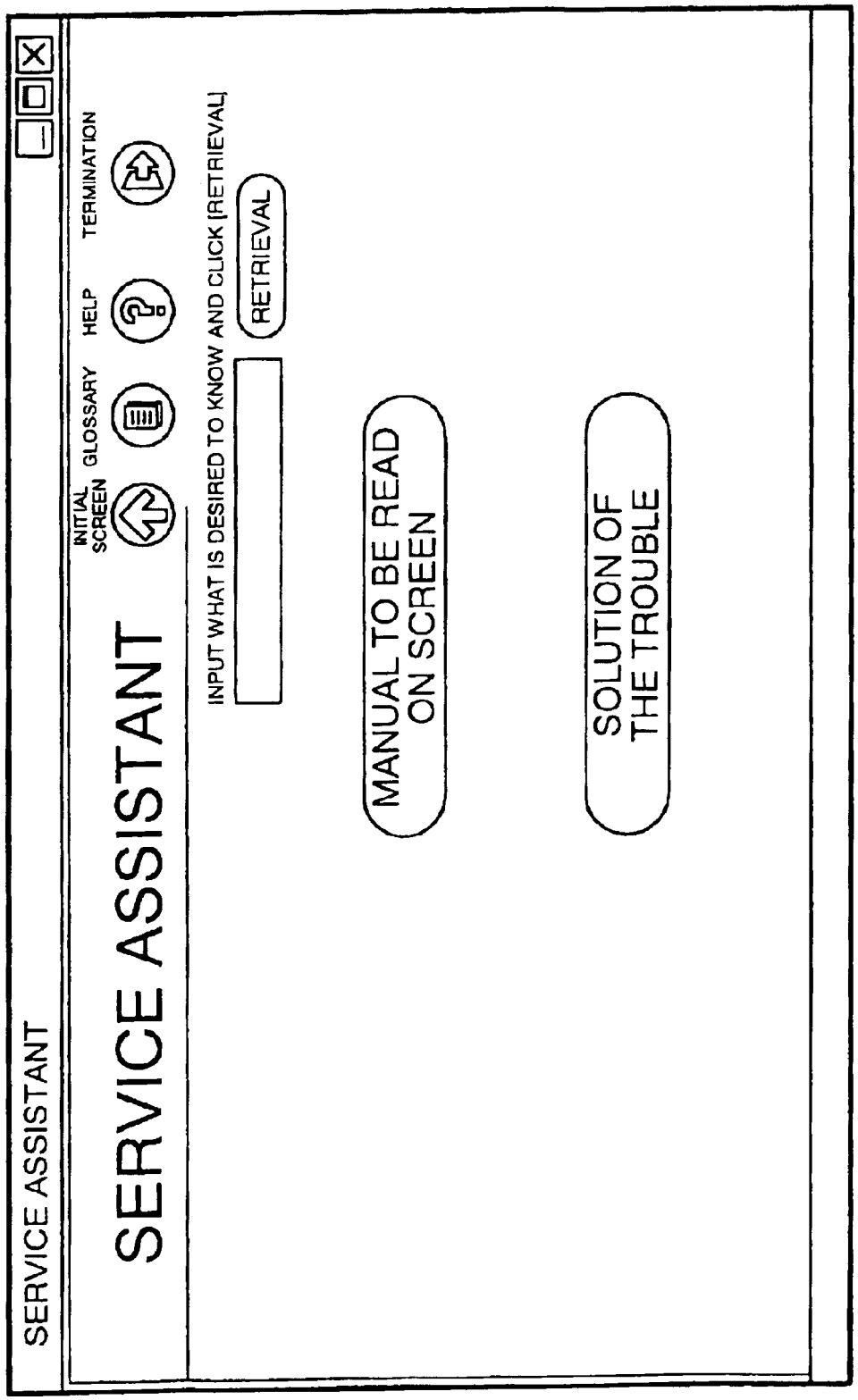
FIG. 6 is a view showing an initial screen to be displayed on a display screen of the client machine.

When the user suspects that some troubles happened on his computer, which operates as the above described client machine, or when he has some doubts about his computer, if a predetermined operation is performed, an initial screen shown in FIG. 6 is displayed. Here, a predetermined operation may be, for example, an operation to click a mouse on a predetermined icon on the display screen. However, there is provided a special function key on the keyboard and, when the user pushes the function key, a screen of FIG. 6 is displayed.

Here, the description will be made by citing an example where an anomaly was found in the screen of the computer of the user.

On the screen of FIG. 6, a [manual to be read on the screen] button, which is clicked when the user tries to refer to the manual (operation book) on the screen for reference, and a [trouble solution] button, which is clicked when some trouble developed on his computer and he tries to solve the trouble, are provided. In addition, on this screen, columns to input character strings whenever he wants to retrieve something are provided.

Here, it is assumed that the [trouble solution] button on the screen of FIG. 6 is mouse-clicked. The fact that the [trouble solution] button was clicked is recorded as the client information.

Figure 7:
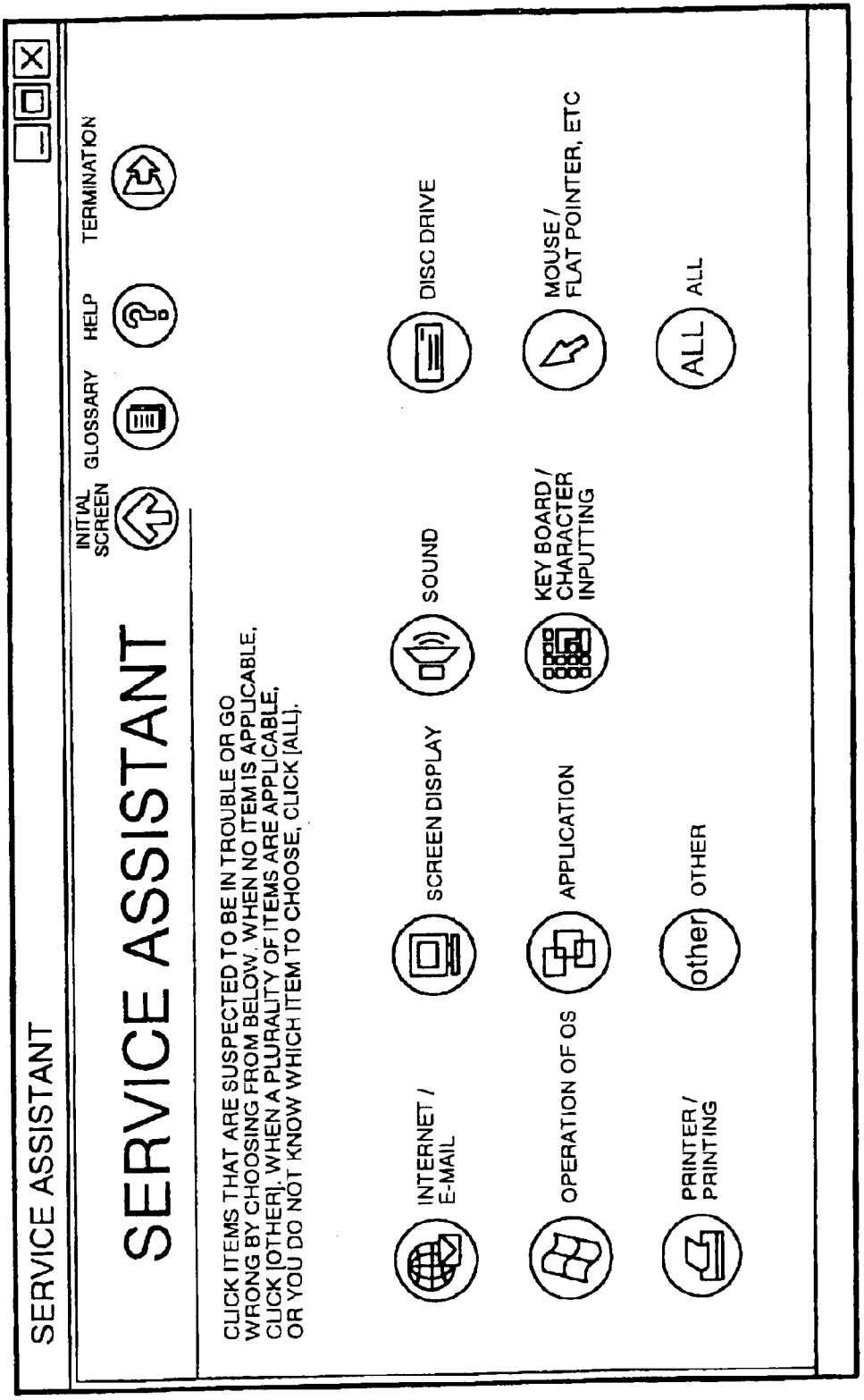
FIG. 7 is a view showing a menu screen of a trouble solution.

When the [trouble solution] button is clicked on the screen of FIG. 6, then, a menu screen shown in FIG. 7 is displayed. Here, the area where the trouble of this computer developed can be designated. Here, a [screen display] icon is mouse-clicked. The fact that this [screen display] icon was mouse-clicked is recorded as the client information.

When the [screen display] icon is clicked on the screen of FIG. 7, a hardware diagnosis program which analyzes a failure of the hardware of the computer is activated inside the computer, and the hardware diagnosis of the place relative to the screen display in the hardware of the computer is conducted.

Figure 8:
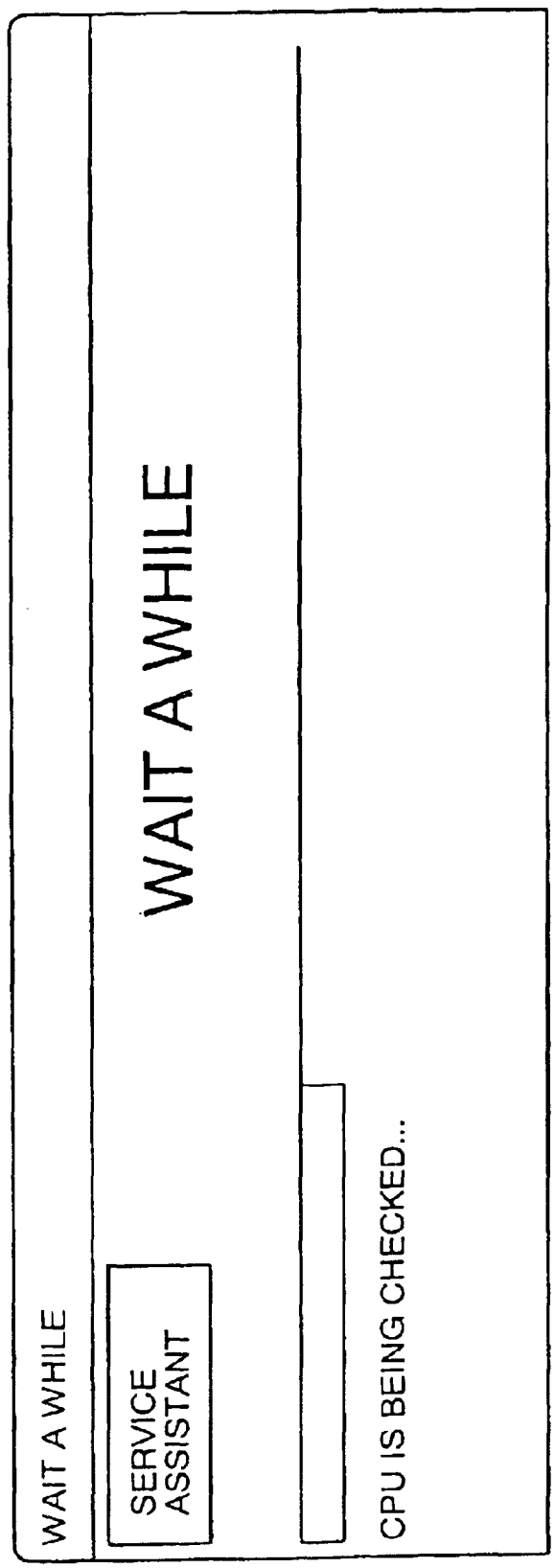
FIG. 8 is a view showing a screen to be displayed during a diagnosis of the hardware of the computer is conducted.

FIG. 8 is a view showing the screen, which is displayed while the diagnosis of the hardware of the computer is conducted.

While the diagnosis of the hardware of the computer is conducted, the screen of the FIG. 8 is displayed.

Figure 9:
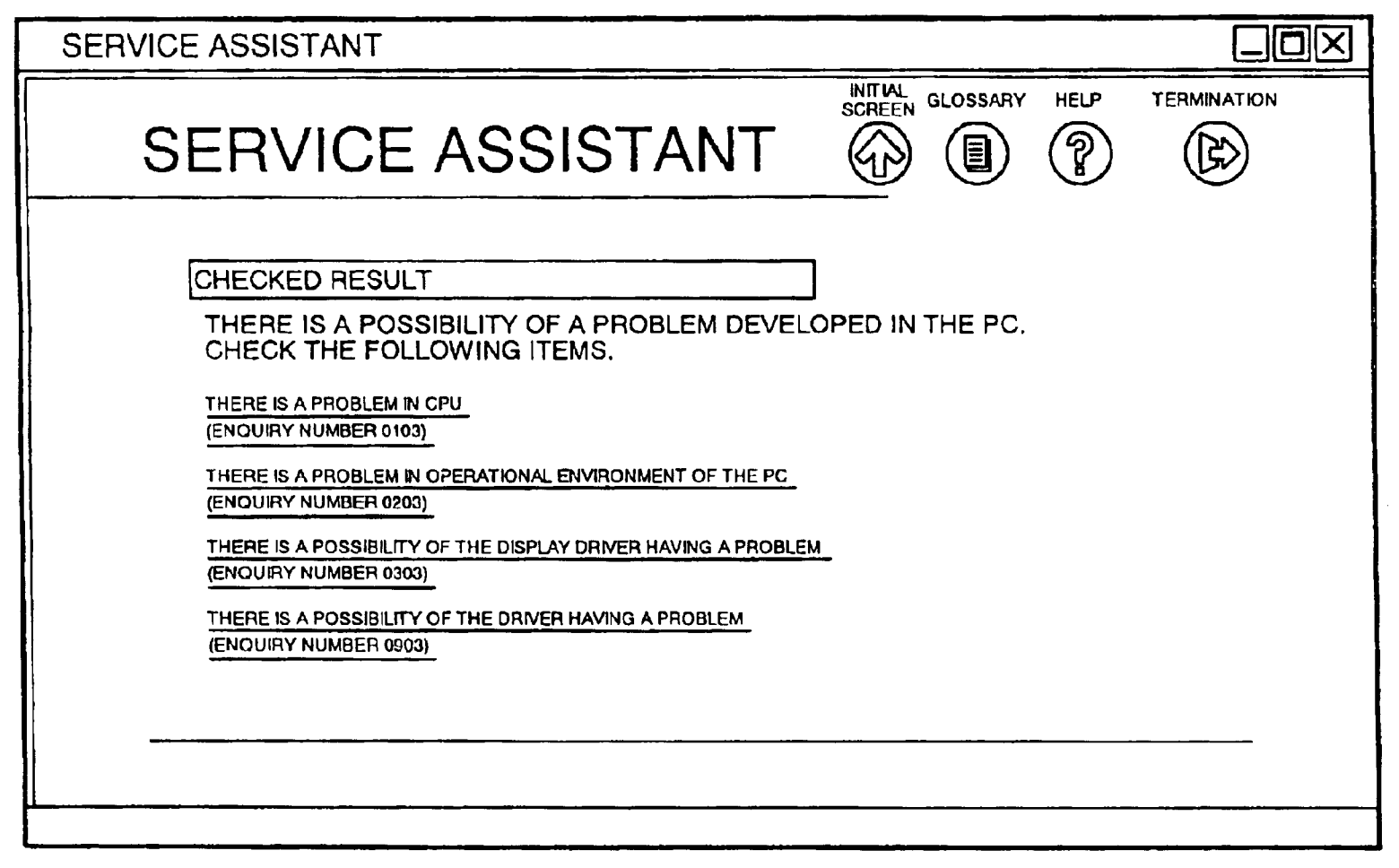

FIG. 9 is a view showing a screen, which is displayed in the case where a problem occurred on the hardware of the computer.

When a problem occurred on the hardware of the computer, more detailed screen is opened so that the symptom of the hardware is minutely analyzed.

Figure 10:
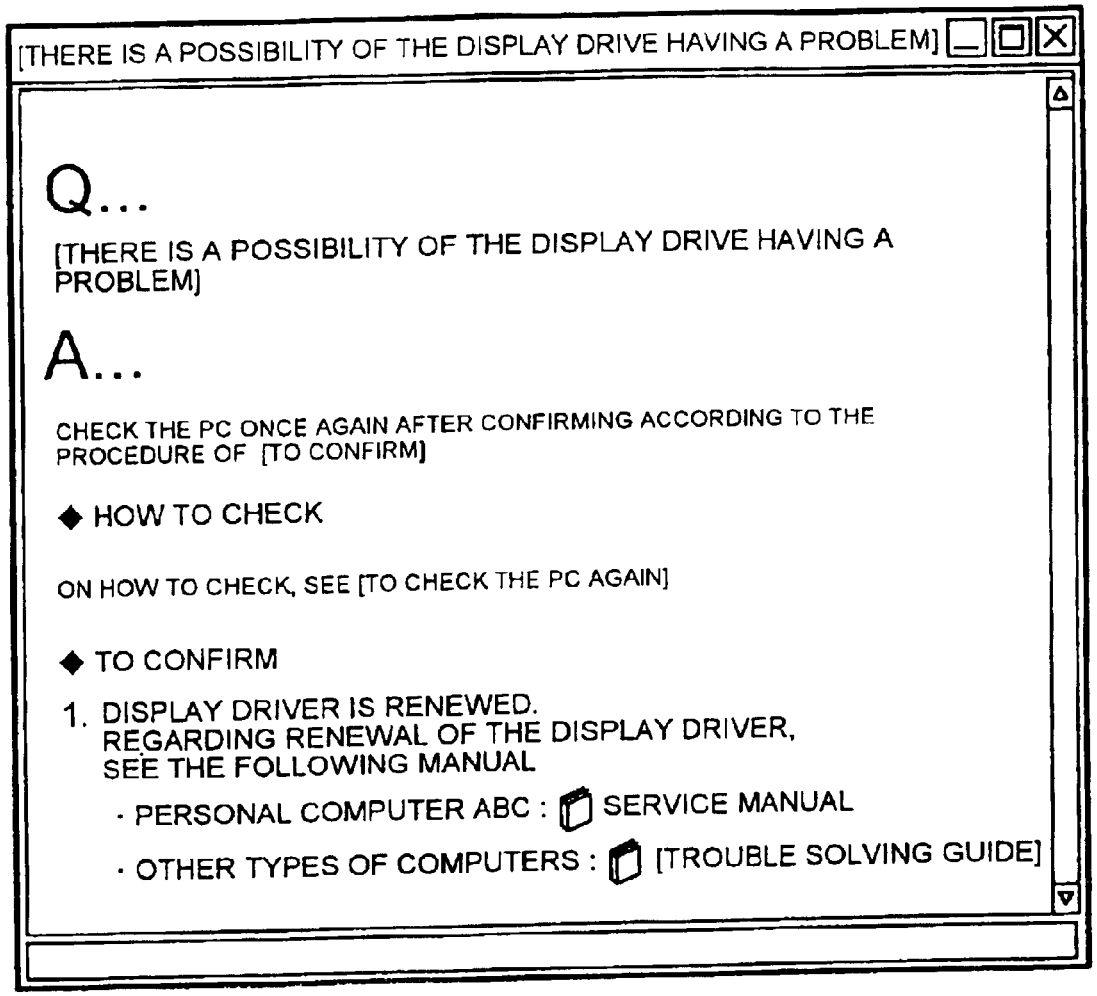
FIG. 10 is a view showing the screen to be displayed when [there is a possibility of having a problem on the display driver] is clicked on the screen of FIG. 9.

FIG. 10 is a view showing a screen to be displayed when [There is the possibility that a display drive has a problem] is mouse-clicked on the screen of the FIG. 9.

When the hardware has a problem, the Q & A screen as shown in FIG. 10 is opened and, by referring to the description on the screen, which part of the hardware is defective is further narrowed down and, then, by contacting the manufacture and the like or by himself, the hardware part is purchased for repairing.

Figure 11:
FIG. 11 is a view showing the screen to be displayed when there was no problem on the hardware as a result of the operation of the hardware diagnosis program.

FIG. 11 is a view showing the screen, which is displayed when there was no problem found on the hardware as a result of the operation of the hardware diagnosis program.

On the screen of FIG. 11, the questions having a high frequency are arranged and, when any of those questions is clicked, the answer prepared in advance to the clicked question is displayed.

Figure 12:
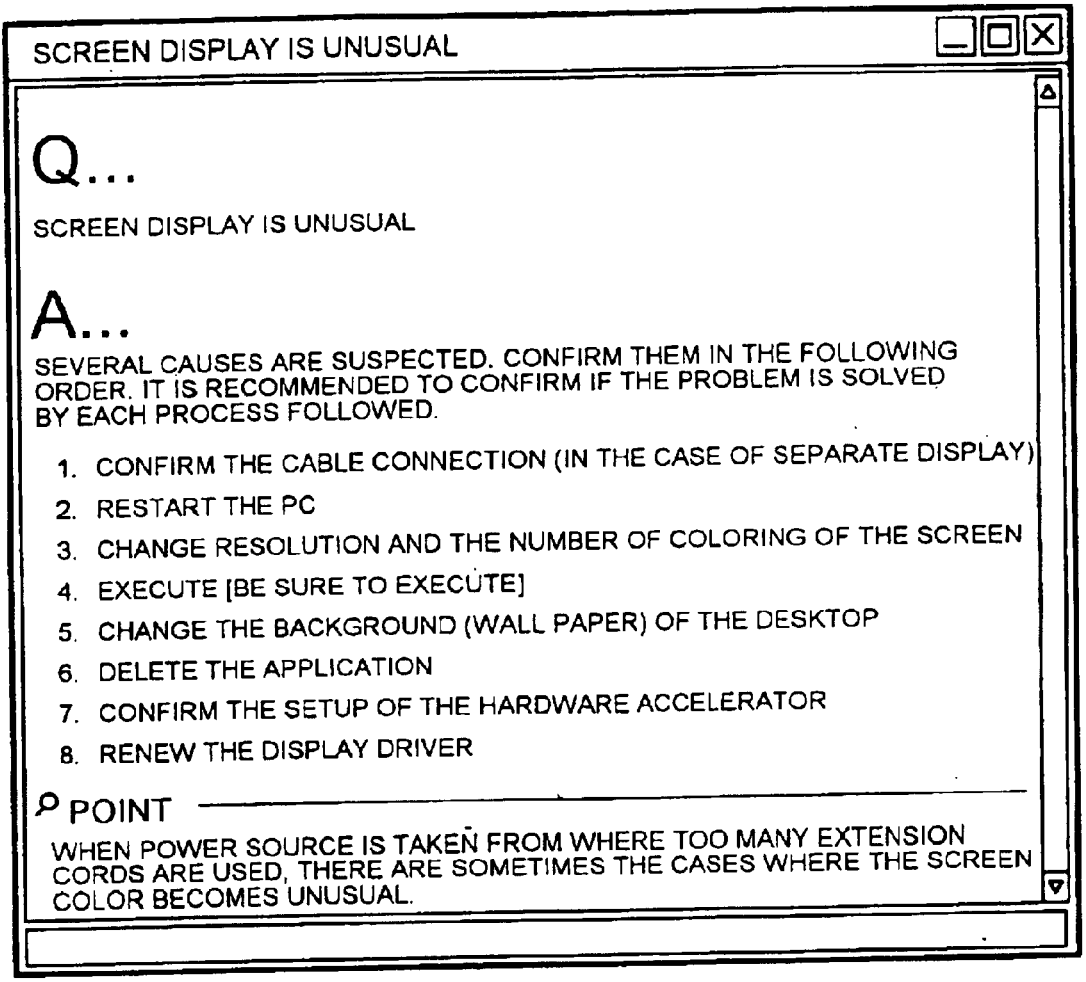
FIG. 12 is a view showing the screen to be displayed when [the screen display is unusual] is clicked on the screen of FIG. 11.

FIG. 12 is a view showing a screen example to be displayed when [the screen display is unusual] was clicked on the screen of FIG. 11.

The user opens the detailed screen in this way and, according to the instruction on the screen, operates the computer so as to attempt the solution of the problem.

Which item was clicked on the screen of FIG. 11 is recorded as the client information.

When a question not found in the items of FIG. 11 is asked, or when the problem is not solved even if those items are referred, characters or sentences are inputted to a character input frame for retrieval which is provided on the screen of FIG. 11 and the [retrieval] button is pushed. Then, the retrieval of the answer with the inputted characters or sentences as key words is performed. This retrieval is performed in relation to the database constructed inside the computer of the user at this stage.

Figure 13:
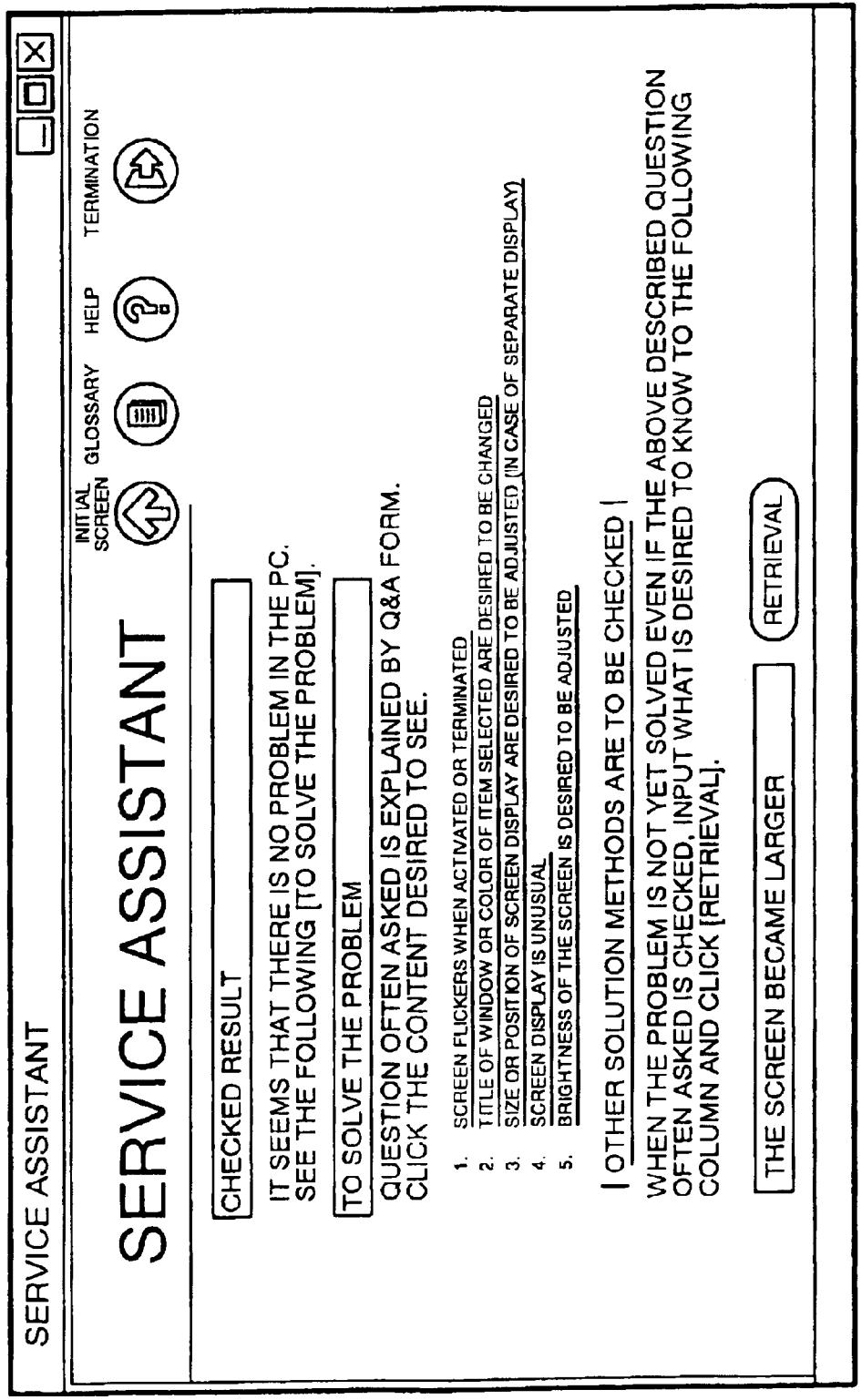
FIG. 13 is a view showing a state of the characters for use of retrieval being inputted to a retrieval character input frame.

FIG. 13 is a view showing a state where the retrieval characters were inputted to the retrieval character input frame.

Here, [the screen size became large] is inputted inside the retrieval character input frame. The characters or sentences inputted to this retrieval character input frame are also recorded as the client information.

For example, when such a sentence is inputted and [retrieval] button is pushed, a natural sentence retrieval engine is activated inside the computer, and the information inside the hard disc is retrieved based on the inputted sentence or the key word detected from there, and the result thereof is displayed.

Figure 14:
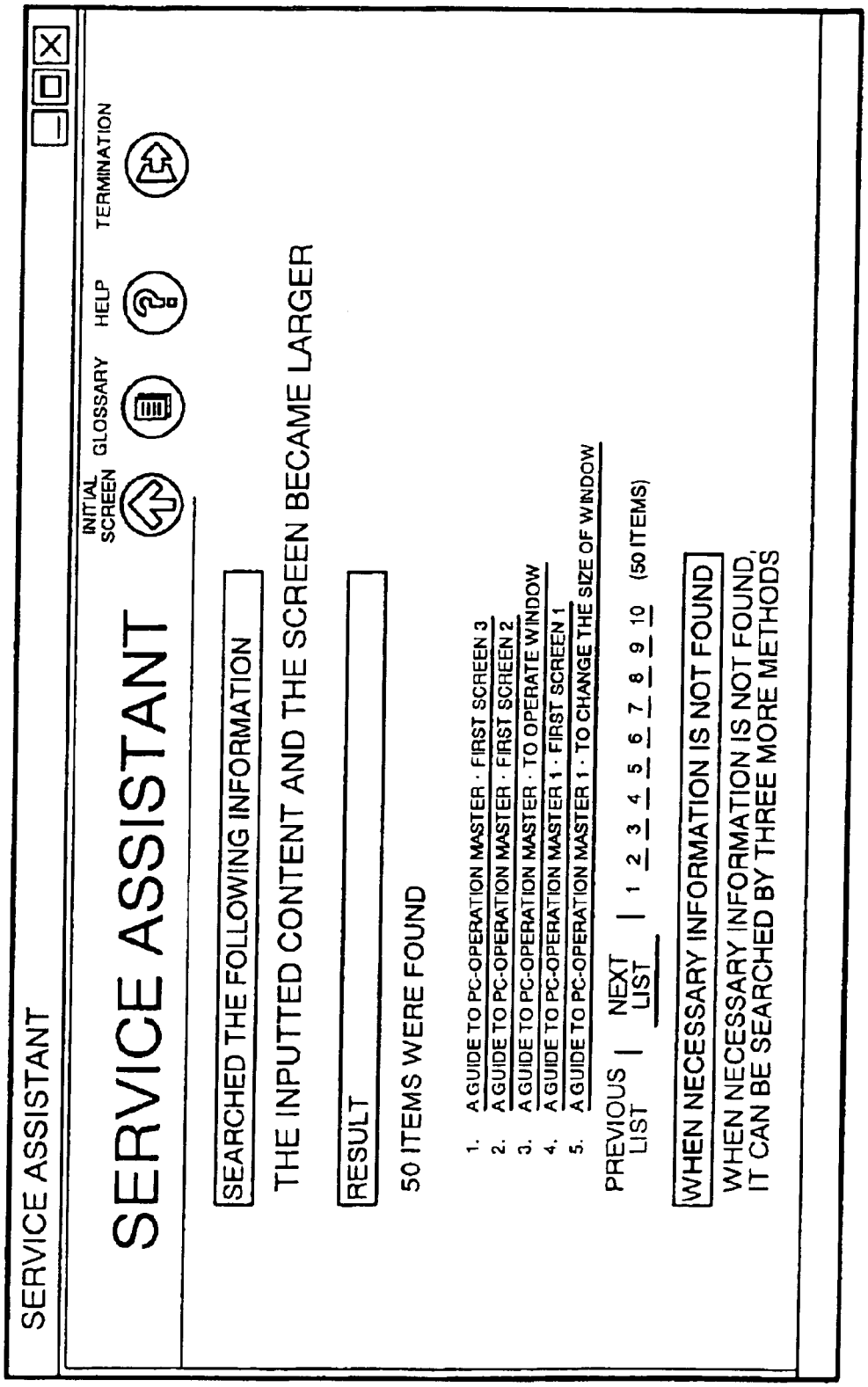
FIG. 14 is the screen showing a retrieval result inside a hard disc 7 of the computer.

FIG. 14 is a screen showing the retrieval result inside the hard disc 7 of the computer.

On the screen of the FIG. 14 are displayed various items and, if the problem is solved by referring to these items, at that point, the answer to the question of the user is completed.

The items to which the user referred on the screen of the FIG. 14 are recorded as the client information.

Figure 15:
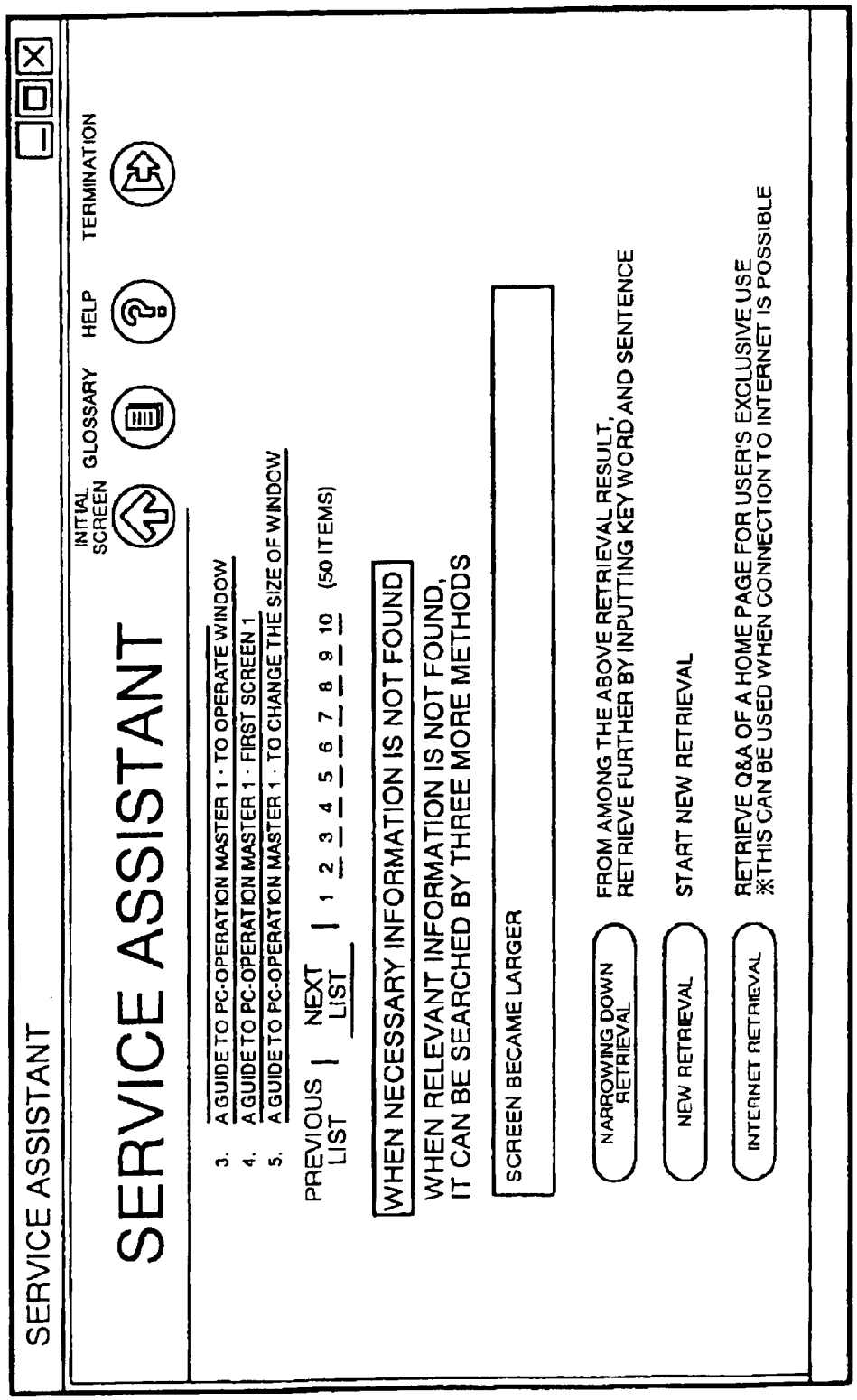
FIG. 15 is a view showing a continuation of the screen of FIG. 14.

FIG. 15 is a view showing a continuation of the screen of FIG. 14.

In the screen of FIG. 14, a screen shown in FIG. 15 still continues at the bottom thereof and, when the screen of FIG. 14 is scrolled by mouse operation, the screen shown in FIG. 15 is displayed.

On the screen of FIG. 15, buttons of [narrowing down retrieval], [new retrieval] and [Internet retrieval] are provided.

The [narrowing down retrieval] button is a button, which is clicked when the retrieval is further performed by newly inputting characters and sentences in order to further narrow down a retrieval result performed with the sentence to the effect that [the screen size became large] and the characters extracted from there as key words, the [new retrieval] button is a button, which newly performs the retrieval by inputting the characters or the sentences again, and the [Internet retrieval] button is a button, which is clicked when the detailed Q & A prepared by the server, where the computer is registered as a client, is referred.

When the [narrowing down retrieval] or the [new retrieval] was performed, the characters and the sentences inputted for the retrieval and the fact that the narrowing down retrieval or the new retrieval was performed are recorded as the client information.

When, on the screen of FIG. 15, or on the screen after the [narrowing down retrieval] or the [new retrieval] was performed, the [Internet retrieval] button is pushed, the client information recorded so far is transmitted to a predetermined server (server machine 7), and the transmission of the answer to the question of the user is requested to the server.

Figure 16:
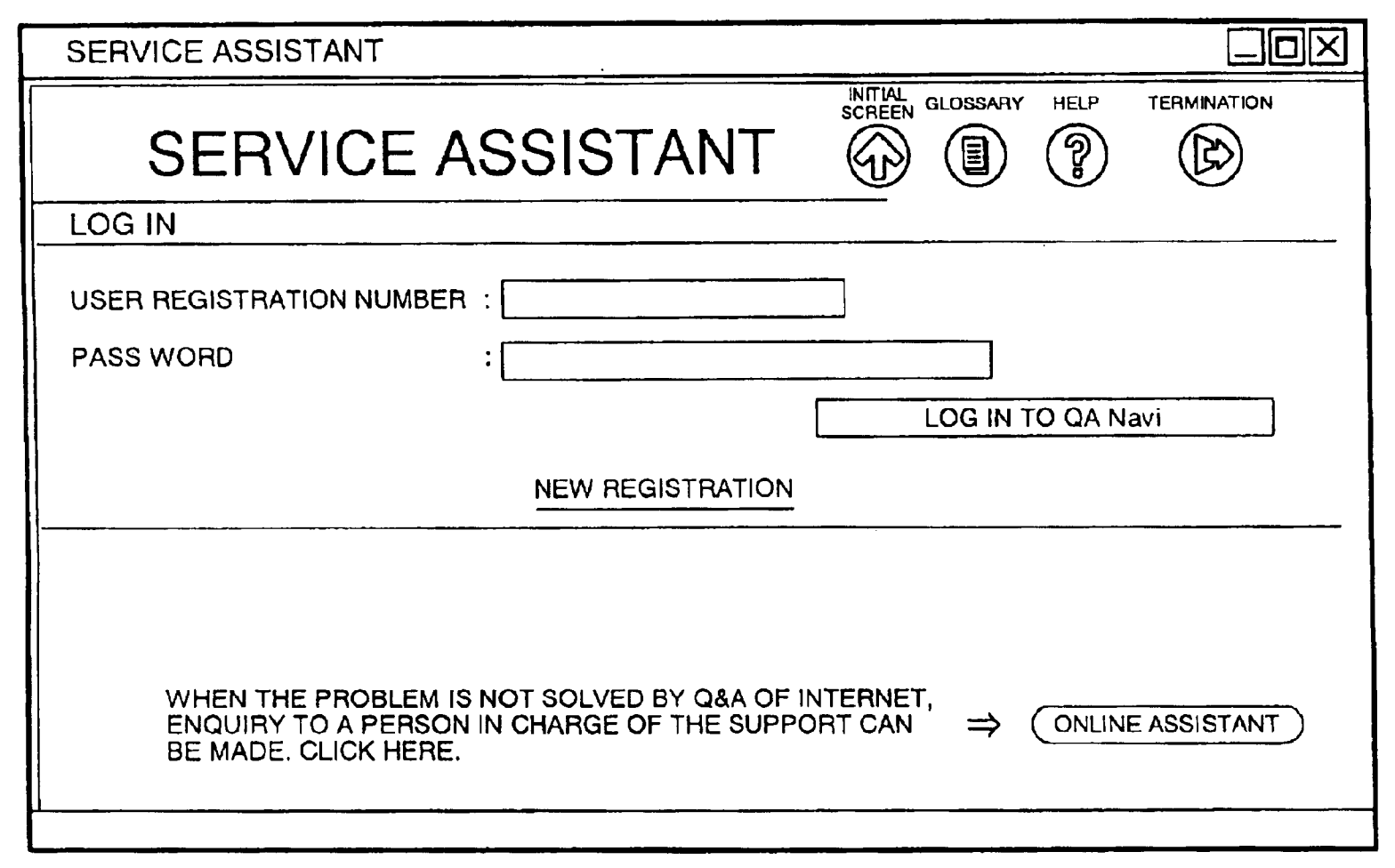

FIG. 16 is a view showing a personal authentication screen.

In the case where the server is connected the first time within the series of retrievals of this time, when the [Internet retrieval] button is clicked on the screen of FIG. 15, the personal certification screen shown in FIG. 16 is displayed and, by inputting a [user registration number] and a [password] on the personal certification screen, the user is connected to the server.

Figure 17:
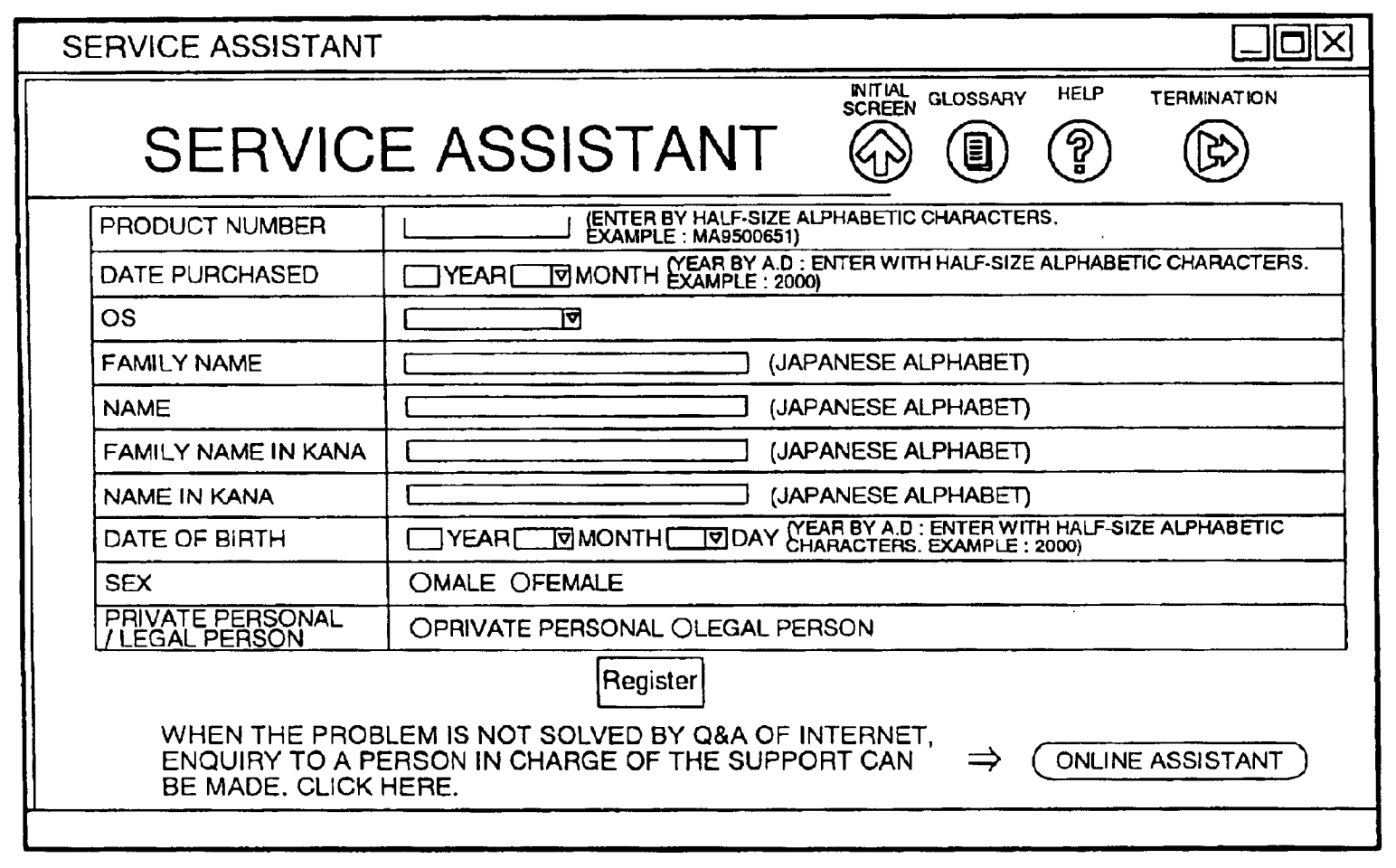

FIG. 17 is a view showing the user registration screen.

The user who does not complete the user registration yet clicks the [new registration] button on the screen shown in FIG. 16. Then, the user registration screen shown in FIG. 17 is displayed. When necessary items are inputted on this screen and the [registration] button is clicked, the user registration is performed and a user registration number is granted.

When the [Internet retrieval] button is clicked on the screen of FIG. 15, the server is connected after going through screens of FIGS. 16, 17 as occasion demands and, as described above, the client information recorded so far is transmitted to the server to request the server the answer. On this occasion, since the client information is transmitted to the server, the user has no need to take the trouble of inputting again the content of his enquiry to the server. Inside the server, based on the transmitted client information, the database of the Q & A inside the server is retrieved, and the answer of that result is transmitted to the client (the computer of the user).

Figure 18:
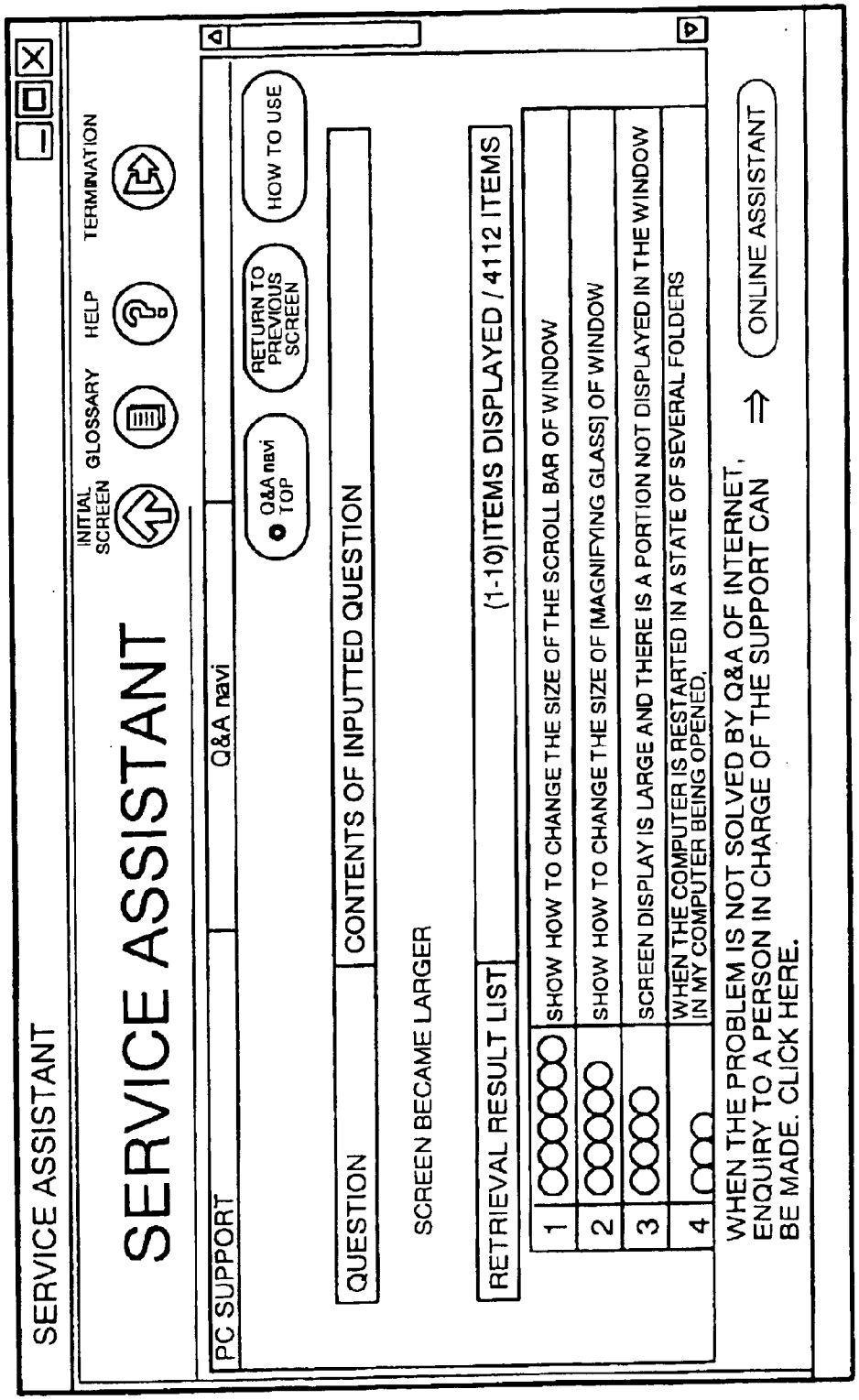
FIG. 18 is a view showing the retrieval result at the server transmitted from the server.

FIG. 18 is a screen showing a retrieval result at the server which was transmitted from the server.

When, on the FIG. 18, any item is clicked, the detail for the clicked item is displayed. Which item was clicked is recorded as the client information.

When the problem is not yet solved in spite of that, a [on line assistant] button on the screen of FIG. 18 is clicked.

Figure 19:
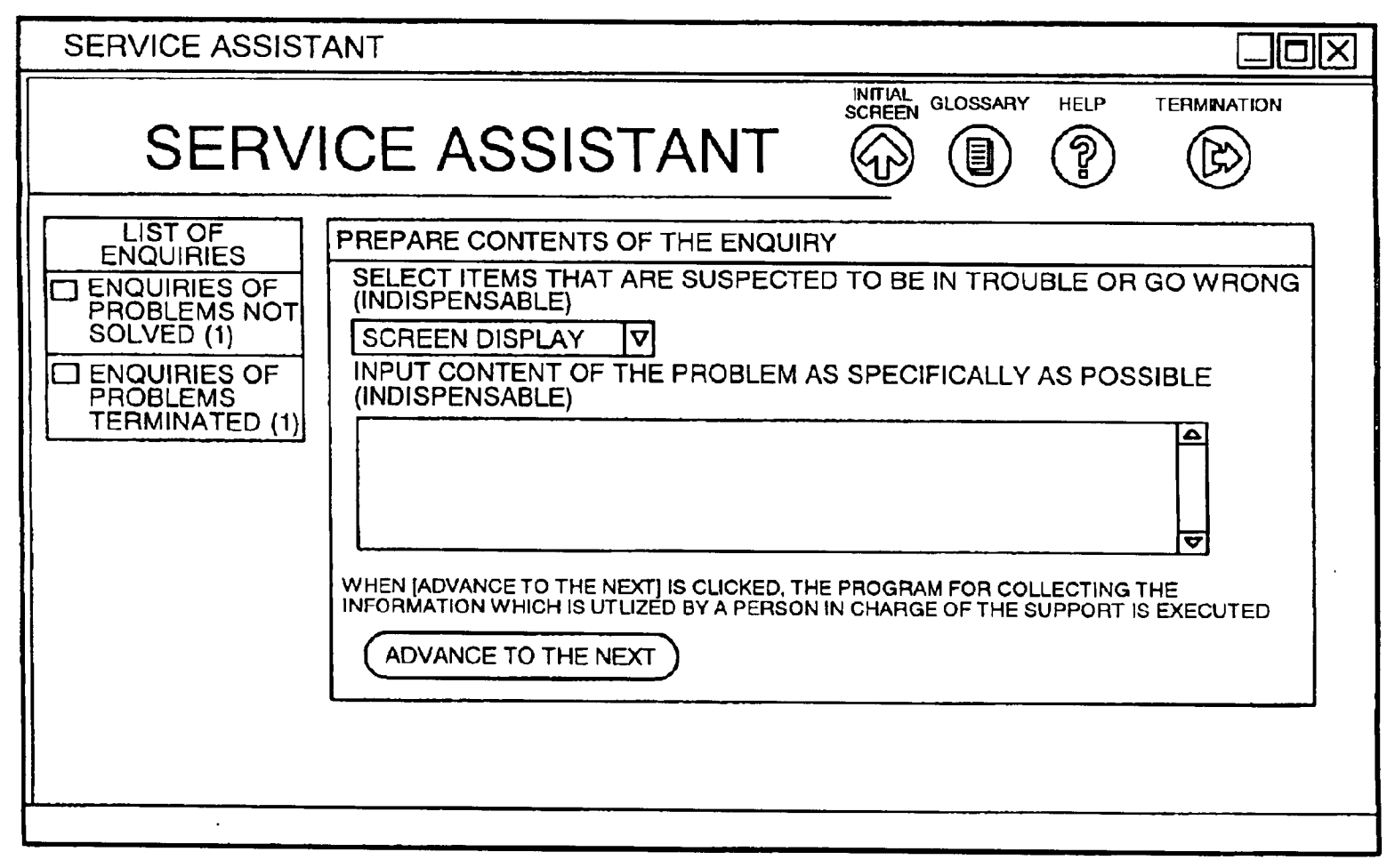

FIG. 19 is a view showing an example of a mail link screen, which is displayed when the [on line assistant] button is clicked.

Here, the item, which the user wants to ask, is selected by user (In FIG. 19, the [screen display] is selected as a preset), and the descriptive sentence of the content of the problem is further inputted.

When an [advance to the next] button is pushed on this screen, an information collection program is executed and, by this information collection program, the system information as to how the environmental setting of the computer of the user is arranged and the like and other information useful for the support are automatically collected.

Figure 20:
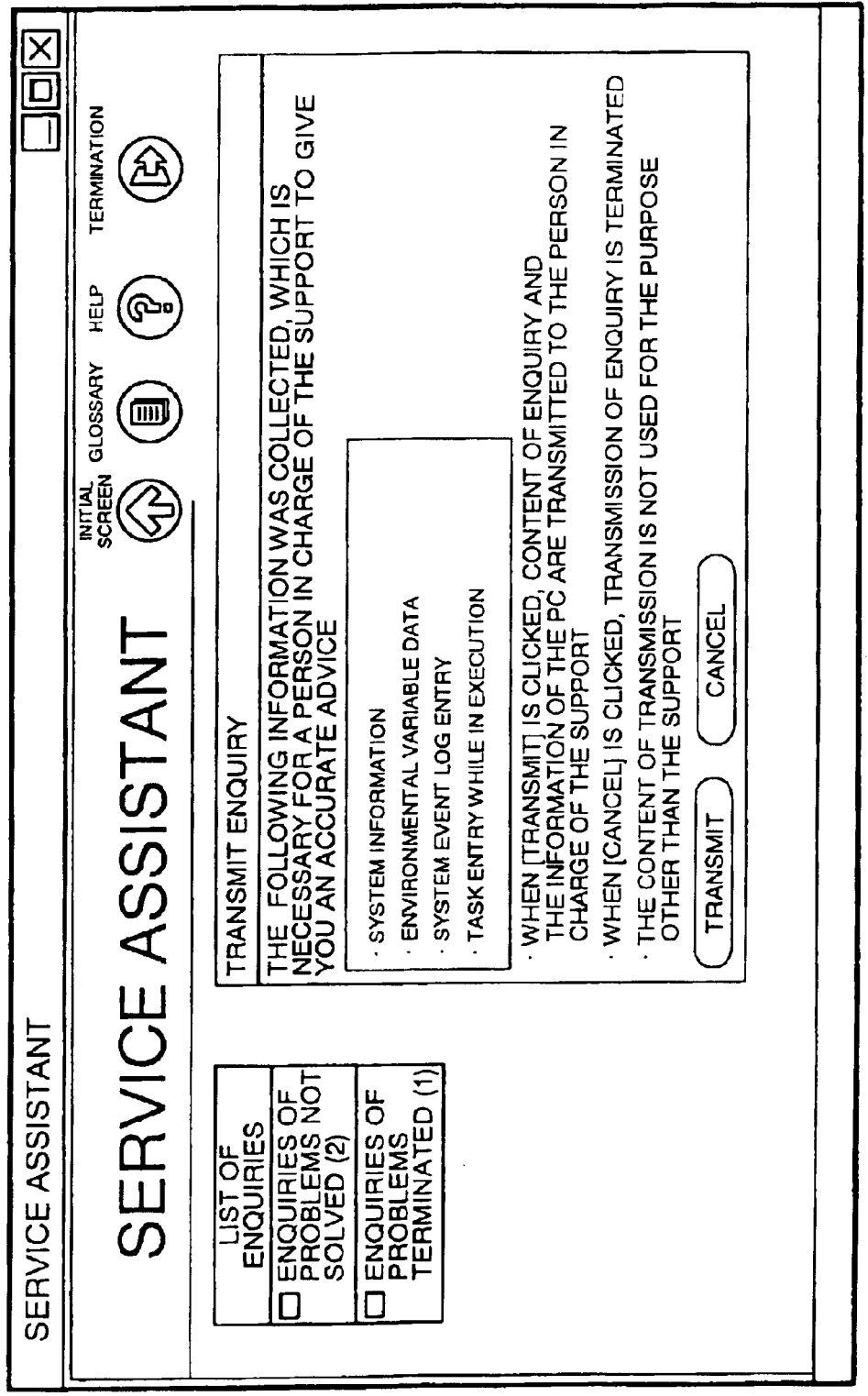
FIG. 20 is a view indicating the screen to show collected information by an information collection program.

FIG. 20 is a view indicating a screen showing the collected information by the information collection program.

After such a screen was displayed, when a [transmit] button is pushed, the client information, the system information, the descriptive sentence by the user and the like are transmitted to a predetermined mail address of the support window.

Figure 21:
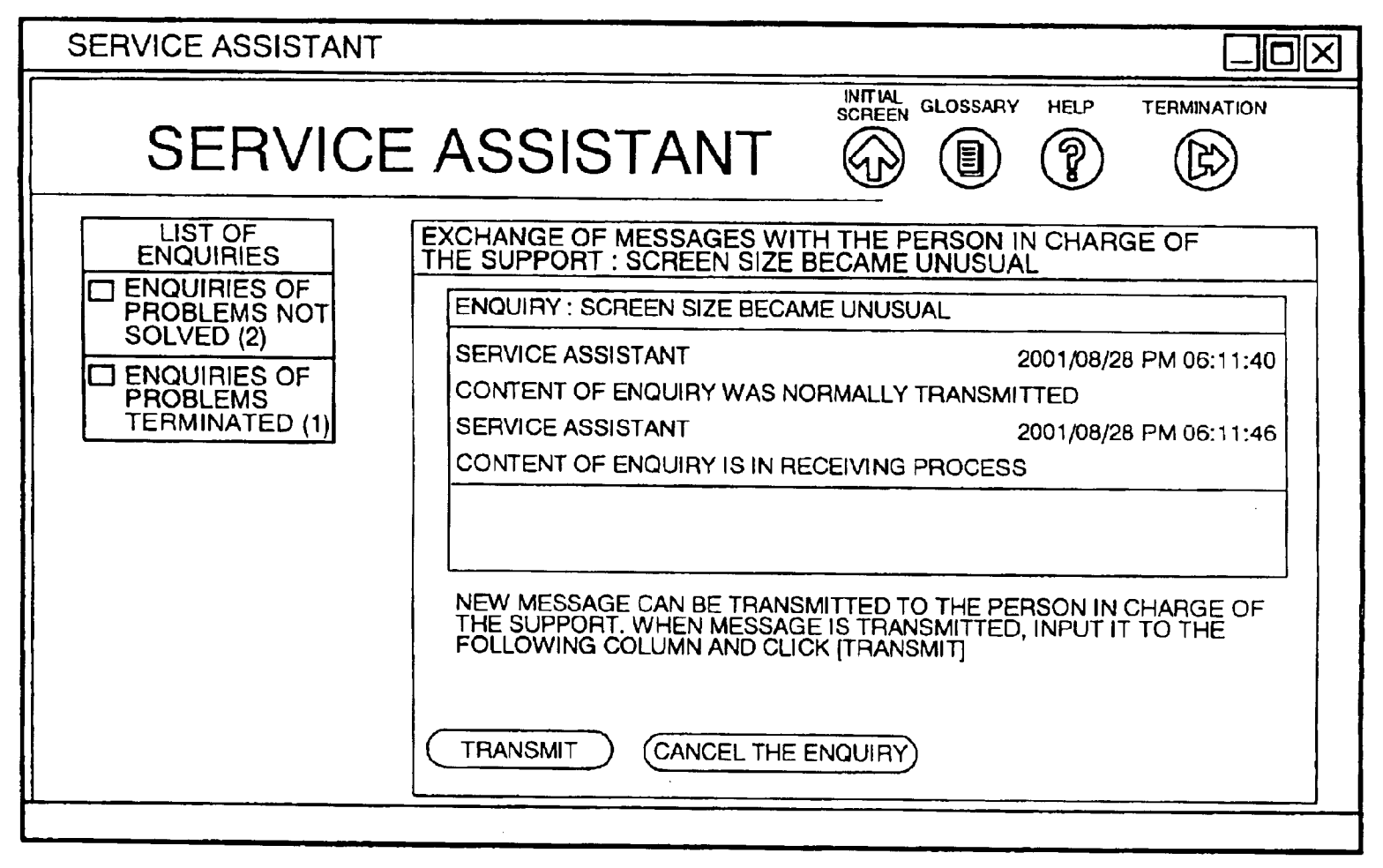

FIG. 21 is a view indicating a screen showing a transmission result.

When a mail is transmitted to the support window, a screen shown in FIG. 21 appears, and the fact that the mail was transmitted is confirmed.

After a while, it is expected that the answer to the question is transmitted from the support window.

In the present invention, by going through the above described procedures, the solution is first attempted inside the user's own computer and, when the problem could not be solved, the procedures (the client information) performed so far are transmitted to the server, and the solution is attempted by the answer from the server and, when the problem is not yet solved in spite of that, a mail is transmitted to the support window.

Here, since all these procedures are performed in collaboration, when an enquiry is made to the server, there is no need to input the content of the enquiry again. Further, when a mail is transmitted to the support window, though the mail content is inputted, the client information indicating the detail checked so far, the system information of the computer of the user and the like are transmitted to the support window and, therefore, if the problem can not be solved inside the client machine, a support using the up-to-date information can be received.

Note that the above described specific embodiment (hereinafter, this embodiment is referred to as [the present embodiment]) is only one example, and it may be constituted as cited below.

(a) The present embodiment is constituted such that the [Internet retrieval] button is displayed on the final primary answer screen. However, the embodiment may be constituted such that the button is displayed not only on the final but also other primary answer screen. That is, when the [Internet retrieval] button is clicked, the client information accumulated so far is transmitted to the server machine, and the server machine may request for the answer based on the client information to be received.

(b) The present embodiment is constituted such that the [Internet retrieval] button is displayed in the answer screen, but it is not necessarily limited to this. For example, the [Internet retrieval] button is not displayed, and the operation of a predetermined key or function key is detected as a communication start instruction and the client information may be transmitted to the server machine, or the [Internet retrieval] button may be displayed on a menu other than the answer screen. Furthermore, the embodiment may be constituted such that, when the user arrived at the final primary answer screen, the communication is automatically started and, with other than the user's communication start instruction as a trigger, the communication with the server machine is started.

(c) The present embodiment is constructed such that the user operation and the history of the display of the primary answer screen according to the user operation are accumulated as the client information, but it is not limited to this. For example, the embodiment may be constituted such that an ID is given to each selection item so as to uniquely specify an item and the ID corresponding to the character strings inputted by the user operation and the selected item is accumulated as the client information and transmitted to the server. In this case, the server machine may be constituted such that the primary answer screen and the item selected on the answer screen are specified from the ID corresponding to the item contained in the client information. Further, the embodiment may be constituted such that the character strings inputted by the user operation and the history of the display of the primary answer screen are accumulated as the client information and transmitted to the server. In this case, the server machine may be constituted such that which item of the answer screen was selected is specified from the history of the primary answer screen display.

(d) The present embodiment is constituted such that it is linked to the e-mail software for notification to the support window, but it is not limited to this. For example, the embodiment may be constituted such that, when having become a status of the notification to the support window, various information collected from the client machine and the client information is stored in the server or in a predetermined storage device of other equipment and the operator of the support window refers to the stored information so as to realize the notification to the support window. Further, when having become a status of the notification to the support window, the server machine may transmit various information collected from the client machine and the client information to the mail address of the support window.

(e) The present embodiment may be constituted such that the answer to the problem is accumulated in the server machine and the relevant answer is retrieved by using the information from the client machine. However, the embodiment may be also constituted such that the answer is formed by using knowledge database based on the information from the client machine.

What is claimed is:

1. A client machine, which is connected to a server machine providing information by a communication line and displays an answer screen according to a question of a user, the client machine comprising:
   a primary answer section which receives the question from the user finds an answer to the question inside the client machine and indicates the answer;
   a client information accumulation section which accumulates client information indicating the question and/or a history of a primary answer screen display according to the question received by said primary answer section;
   a secondary answer request section, which transmits the client information accumulated in said client information accumulation section to said server machine and requests the server machine the answer to the question of the user when the answer to the question is not found inside the client machine; and
   a secondary answer section, which obtains the answer transmitted from the server machine according to the request for the answer to said server machine by said secondary answer request section and displays the secondary answer screen indicating the answer.

2. The client machine according to claim 1, further comprising
   a communication start instruction section to start a communication with said server machine, wherein said secondary answer request section transmits said client information to said server machine according to an operation of said communication start instruction section.

3. The client machine according to claim 2, wherein said primary answer section displays said communication start instruction section inside the primary answer screen indicating at least a final answer, which can answer to the question of the user in the primary answer section.

4. The client machine according to claim 1, wherein the client information accumulated in said client information accumulation section is transmitted to a window which receives the question of the user by a communication line.

5. The client machine according to claim 4, wherein said client information is transmitted to the window by e-mail.

6. The client machine according to claim 4, wherein said client machine receives the question from the user regarding a problem which occurred on the client machine and displays an answer screen indicating the answer to the problem.

7. The client machine according to claim 1, wherein said secondary answer section displays a mailing instruction section to activate an e-mail software inside the secondary answer screen, comprising:
   an e-mail link section which activates the e-mail software according to an operation of the mailing instruction section by the user on the secondary answer screen including said mailing instruction section displayed by said secondary answer section and delivers an email address which receives the question of the user to the e-mail software.

8. The client machine according to claim 7, wherein said mailing instruction section is displayed inside the secondary answer screen indicating at least a final answer, which can answer to the question of the user in said server machine.

9. The client machine according to claim 7, wherein said client information accumulation section accumulates the question of the user and/or the history of the secondary answer screen display according to the question as the client information,
   wherein said e-mail link section delivers said email address to said e-mail software and, further, delivers the client information accumulated by said client information accumulation section.

10. The client machine according to claim 7, wherein said client machine receives the question from the user regarding a problem which occurred on the client machine and displays the answer screen indicating the answer problem.

11. A server machine, which is connected by a communication line to a client machine which receives the feeding of information, and which transmits an answer to a question from a user of the client machine to the client machine,
    wherein said client machine receives the question from the user, finds the answer according to the question inside the client machine and displays the primary answer screen indicating the answer and, at the same, accumulates client information indicating the question and/or the history of the primary answer screen display according to the question and transmits the client information to this server machine so as to request the answer to the question of the user when the answer to the question is not found inside the client machine,
    the server machine comprising:
    a client information receiving section which receives the transmitted client information;
    an answer specifying section to specify the answer to the question of the user of said client machine based on the client information received from said client information receiving section; and
    an answer transmitting section which transmits the answer specified by said answer specifying section to said client machine.

12. A client program storage medium which stores a client program, which is executed inside a computer connected to a server machine which feeds information by a communication line so as to allow the computer to operate as a client machine to display an answer screen according to a question of an user, comprising:
    a primary answer section which receives the question, finds the answer to the question inside the computer and displays an primary answer screen indicating the answer.
    a client information accumulation section which accumulates client information indicating the question and/or a history of the primary answer screen display according to the question received by the primary answer section;
    a secondary answer request section which transmits the client information accumulated in said client information accumulation section and requests the server machine the answer to the question of the user when the answer to the question is not found inside the computer; and
    a secondary answer section which obtains the answer transmitted from the server machine according to the request of the answer to said server machine by said secondary answer request section and displays the secondary answer screen indicating the answer.

13. The client program storage medium according to claim 12, further comprising a communication start instruction section, wherein said secondary answer request section transmits said client information to said server machine according to an operation of the communication start instruction section to start the communication with said server machine.

14. The client program storage medium according to claim 13, wherein said primary answer section displays said communication start instruction section inside the primary answer screen indicating at least a final answer, which can answer to the question of the user in the primary answer section.

15. The client program storage medium according to claim 12, wherein said client program transmits the client information accumulated in said client information accumulation section to a window which receives the question of the user by the communication line.

16. The client program storage medium according to claim 15, wherein said client program transmits said client information to the window by e-mail.

17. The client program storage medium according to claim 15, wherein said client program receives the question of the user regarding a problem which occurred on said client machine and displays the answer screen indicating an answer to the problem.

18. The client program storage medium according to claim 12, wherein said secondary answer section displays a mailing instruction section to activate e-mail software inside the secondary answer screen, wherein said client program further activates the e-mail software according to the operation of the mailing instruction section by the user on the secondary answer screen including said mailing instruction section displayed by said secondary answer section and allows the e-mail software to operate as the client machine comprising an e-mail link section which delivers an email address receiving the question of the user to the e-mail software.

19. The client program storage medium according to claim 18, wherein said mailing instruction section is displayed inside the secondary answer screen indicating at least a final answer, which can answer to the question of the user in said server machine.

20. The client program storage medium according to claim 18, wherein said client information accumulation section accumulates the question and/or the history of the secondary answer screen display according the question, wherein an e-mail link section delivers said email address to said e-mail software and, further, delivers the client information accumulated in said client information accumulation section.

21. The client program storage medium according to claim 12, wherein said client program receives the question from the user regarding problem which occurred on said computer and displays the answer screen indicating the answer aiming at the solution of the trouble.

22. A server program storage medium storing a server program, which is executed inside a computer connected to a client machine receiving the feeding of information by a communication line so as to allow the computer to operate as a server machine to transmit an answer to a question from a user of the client machine to the client machine, wherein said client machine receives the question, finds the answer to the question inside the client machine and displays the primary answer screen indicating the answer and, at the same time, accumulates the client information indicating the question and/or the history of the primary answer screen display according to the question and transmits the client information to this server machine so as to request the answer to the question of the user, wherein the computer is allowed to operate as the server machine comprising:
a client information receiving section which receives the transmitted client information;
an answer specifying section which specifies the answer to the question of the user of said client machine based on the client information received by said client information receiving section when the answer to the question is not found inside the client machine; and
an answer transmitting section which transmits the answer specified by said answer specifying section to said client machine.

23. A client machine connected to a server via a communication line and comprising:
an answer section which receives a question of a user and searches for an answer to the question inside the client machine and indicates the answer when found; and
a client information accumulation section which accumulates client information indicating the question and activity history of the answer section,
wherein when the answer to the question is not found in the client machine, the client information is transmitted to the server and a request is made for the server to answer the question of the user.

* * * * *

UNITED STATES PATENT AND TRADEMARK OFFICE
CERTIFICATE OF CORRECTION

PATENT NO. : 6,883,005 B2
DATED : April 19, 2005
INVENTOR(S) : Shigeru Hidesawa et al.

It is certified that error appears in the above-identified patent and that said Letters Patent is hereby corrected as shown below:

Column 15,
Line 14, after "user" insert -- , --.

Column 16,
Line 23, after "same" insert -- time --.
Line 48, change "an" to -- a --.

Column 18,
Line 3, after "regarding" insert -- a --.

Signed and Sealed this

Twenty-second Day of November, 2005

JON W. DUDAS
*Director of the United States Patent and Trademark Office*